US009037846B2

(12) United States Patent
Furukawa

(10) Patent No.: US 9,037,846 B2
(45) **Date of Patent: *May 19, 2015**

(54) ENCODED DATABASE MANAGEMENT SYSTEM, CLIENT AND SERVER, NATURAL JOINING METHOD AND PROGRAM

(75) Inventor: Jun Furukawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 65 days.

This patent is subject to a terminal disclaimer.

(21) Appl. No.: 13/993,520

(22) PCT Filed: Dec. 6, 2011

(86) PCT No.: PCT/JP2011/078185

§ 371 (c)(1), (2), (4) Date: Jun. 12, 2013

(87) PCT Pub. No.: WO2012/081450

PCT Pub. Date: Jun. 21, 2012

(65) Prior Publication Data

US 2013/0268750 A1 Oct. 10, 2013

(30) Foreign Application Priority Data

Dec. 13, 2010 (JP) ................................ 2010-277070

(51) Int. Cl.

*H04L 29/00* (2006.01)
*H04L 29/06* (2006.01)

(Continued)

(52) U.S. Cl.

CPC ........ *H04L 63/0428* (2013.01); *G06F 21/6218* (2013.01); *G06F 21/6227* (2013.01); *H04L 9/0894* (2013.01); *H04L 9/3066* (2013.01)

(58) Field of Classification Search

USPC ................................................ 713/153–154

See application file for complete search history.

(56) References Cited

U.S. PATENT DOCUMENTS

| | | | | |
|---|---|---|---|---|
| 7,093,137 | B1 | 8/2006 | Sato et al. | |
| 2008/0033960 | A1* | 2/2008 | Banks et al. | 707/9 |
| 2008/0059414 | A1 | 3/2008 | Cristofor et al. | |
| 2009/0313212 | A1* | 12/2009 | Aust | 707/2 |

FOREIGN PATENT DOCUMENTS

| | | |
|---|---|---|
| JP | 2-132559 A | 5/1990 |
| JP | 9-510565 A | 10/1997 |

(Continued)

OTHER PUBLICATIONS

Paul Needham et al., "Oracle Advanced Security Technical White Paper", Oracle Japan, Jun. 2007, (Searched Sep. 3, 2010), Internet <URL: http://otndnld.oracle.co.jp/products/database/oracle11g/pdf/twp_security_db_advancedsecurity_11gR1.pdf>.

(Continued)

*Primary Examiner* — Ghazal Shehni
(74) *Attorney, Agent, or Firm* — Sughrue Mion, PLLC

(57) ABSTRACT

An encrypted database management system includes: a client terminal which includes a column encrypting unit that uses an encrypting key and a group generator to encrypt data of columns indicated by specific labels of externally input tables, and output it, an intra-label projection request unit that generates an intra-label key from encrypting key and label, and outputs it, and an inter-label projection request unit that generates an inter-label projection key from encrypted key, label, and intra-label key; and a database server which includes an intra-label projection unit that generates an intra-label comparison value by the action of label and intra-label key on data of columns of specific labels of encrypted tables, an inter-label projection unit that generates an inter-label comparison value by the action of the inter-label projection key on intra-label comparison value, and an encrypted table natural join unit that conducts natural joining using intra-label comparison value.

12 Claims, 25 Drawing Sheets

(51) Int. Cl.
*G06F 21/62* (2013.01)
*H04L 9/08* (2006.01)
*H04L 9/30* (2006.01)

(56) References Cited

FOREIGN PATENT DOCUMENTS

| | | | |
|---|---|---|---|
| JP | 10-124533 | A | 5/1998 |
| JP | 11-65441 | A | 3/1999 |
| JP | 11-143780 | A | 5/1999 |
| JP | 2000-267565 | A | 9/2000 |
| JP | 2001-101055 | A | 4/2001 |
| JP | 2007-114494 | A | 5/2007 |
| JP | 2010-503118 | A | 1/2010 |

OTHER PUBLICATIONS

Hiroyuki Kitagawa, “Database System”, Shokodo, Jul. 1996.
International Search Report for PCT/JP2011/078185 dated Feb. 14, 2012.

* cited by examiner

ENCRYPTED TABLE A  33a

| ... | LABEL [1] | ... |
|---|---|---|
| ... | ea[1] | ... |
| ... | ... | ... |
| ... | ea[i] | ... |
| ... | ... | ... |
| ... | ea[N] | ... |

37 →

43a

ENCRYPTED TABLE B  33b

| ... | LABEL [2] | ... |
|---|---|---|
| ... | eb[1] | ... |
| ... | ... | ... |
| ... | eb[j] | ... |
| ... | ... | ... |
| ... | eb[M] | ... |

TABLE A

932

| USER NAMES | CREDIT CARD NUMBERS |
|---|---|
| AOYAMA | 12334 |
| IMAI | 30785 |
| UEDA | 48929 |
| EGUCHI | 59876 |
| OKAMOTO | 29864 |
| ... | ... |

FIG. 23

ENCRYPTED TABLE A

941

| USER NAMES | CREDIT CARD NUMBERS |
|---|---|
| AOYAMA | enc(key,12334) |
| IMAI | enc(key,30785) |
| UEDA | enc(key,48929) |
| EGUCHI | enc(key,59876) |
| OKAMOTO | enc(key,29864) |
| ... | ... |

FIG. 24A

ENCRYPTED TABLE A

941

| USER NAMES | CREDIT CARD NUMBERS |
|---|---|
| AOYAMA | enc(key,12334) |
| IMAI | enc(key,30785) |
| ... | ... |

FIG. 24B

ENCRYPTED TABLE B

942

| CREDIT CARD NUMBERS | CREDIT CARD EXPIRATION DATE |
|---|---|
| enc(key',12334) | 2012/5/18 |
| enc(key',30785) | 2011/9/17 |
| ... | ... |

FIG. 24C

TABLE A×B

981

| USER NAMES | CREDIT CARD NUMBERS | CREDIT CARD EXPIRATION DATE |
|---|---|---|
| AOYAMA | 12334 | 2012/5/18 |
| IMAI | 30785 | 2011/9/17 |
| ... | ... | ... |

FIG. 25A

ENCRYPTED TABLE C

1001

| USER NAMES | CREDIT CARD NUMBERS |
|---|---|
| EGUCHI | enc(key,59786) |
| OKAMOTO | enc(key,29864) |
| ... | ... |

FIG. 25B

ENCRYPTED TABLE D

1002

| CREDIT CARD NUMBERS | BLACKLIST REGISTERED DATE |
|---|---|
| enc(key,59786) | 2007/3/3 |
| enc(key,29864) | 2006/6/6 |
| ... | ... |

FIG. 25C

ENCRYPTED TABLE C×D

1003

| USER NAMES | CREDIT CARD NUMBERS | BLACKLIST REGISTERED DATE |
|---|---|---|
| EGUCHI | enc(key,59786) | 2007/3/3 |
| OKAMOTO | enc(key,29864) | 2006/6/6 |
| ... | ... | ... |

ENCODED DATABASE MANAGEMENT SYSTEM, CLIENT AND SERVER, NATURAL JOINING METHOD AND PROGRAM

CROSS REFERENCE TO RELATED APPLICATIONS

This application is a National Stage of International Application No. PCT/JP2011/078185 filed Dec. 6, 2011, claiming priority based on Japanese Patent Application No. 2010-277070 filed Dec. 13, 2010, the contents of all of which are incorporated herein by reference in their entirety.

TECHNICAL FIELD

The present invention relates to an encrypted database management system, a client, a server, a natural joining method, and a program thereof. More specifically, the present invention relates to an encrypted database management system and the like capable of performing natural joining of a plurality of tables of an encrypted database without completely decrypting each element of the data.

BACKGROUND ART

Because the base bones of business works in enterprises are being computerized, most of the enterprises come to have large-scaled databases that hold a great amount of data used in those business works. Those data are important data in terms of the business works, so that it is absolutely essential to prevent those data from being leaked to outside also in terms of protecting personal information. Therefore, it is common to encrypt the data to be held in such large-scaled databases.

A database can be considered as an aggregate of a large number of tables. "Natural joining" herein means to join two tables into one by integrating columns when there are the columns showing same data in the two tables. Hereinafter, a typical method depicted in Non-Patent Document 1 and the like executed for naturally joining two tables in a database in which the held data is encrypted (referred to as an encrypted database hereinafter) will be described.

FIG. 18 is an explanatory chart showing the structure of an encrypted database management system 901 according to a typical technique regarding the encrypted database. The encrypted database management system 901 is constituted with an encrypted database client 910 and an encrypted database server 950 mutually connected via a LAN (Local Area Network) and the like.

The encrypted database client 910 has the structure as a typical computer device. That is, the encrypted database client 910 includes a central processing control module (CPU: Central Processing Unit) 911 that is the main unit for executing computer programs, a storage module 912 for storing data, an input module 913 for accepting operations done by the user, and an output module 914 for presenting processing results to the user, and a communication module 915 for performing data communications with other computers.

In the central processing control module 911, a column encrypting unit 921 and an encrypted table natural joining request unit 922 are structured to execute respective functions to be described later as each computer program according to operation commands from the user. Further, in the storage module 912, each of individual private key 931*a* and private key' 931*b* used in processing to be described later is stored. Furthermore, a table A932 and a table B933 to be the targets of encryption and natural joining are inputted to the input module 913.

The encrypted database server 950 also has the structure as a typical computer device. That is, the encrypted database server 950 includes a central processing control module 971 as the main unit for executing computer programs, a storage module 952 for storing data, and a communication module 953 for performing data communications with other computers.

In the central processing control module 971, an encrypted table natural joining unit 963 and a data receiving unit 964 are structured to execute respective functions to be described later as computer programs according to operation commands from the encrypted database client 910.

Further, an encrypted table A941 and an encrypted table B942 which are encryptions of each of the tables A933 and B934, as well as a public key pkey972*a* and a public key pkey'972*b* corresponding, respectively, to the private key key931*a* and the private key key'931*b* of the encrypted database client 910 received by the data receiving unit 964 from the encrypted database client 910 are stored in the storage module 952.

FIG. 19 is an explanatory chart for describing the functions of the column encrypting unit 921 shown in FIG. 18 in more details. The column encrypting unit 921 includes an encrypting function 921*a* and a table update function 921*b*. The encrypting function 921*a* encrypts a specific column (referred to as column a) of the table A932 by using the private key key931*a* and outputs a ciphertext 943. The table update function 921*b* outputs the table in which each data of the column a is replaced with the ciphertext 943 as an encrypted table A941, and transmits it to the encrypted database server 950. In the encrypted database server 950, the data receiving unit 964 stores those to the storage module 952.

The column encrypting unit 921 also outputs an encrypted table B942 in which a specific column (referred to as column b) of the table B933 is replaced with a ciphertext by using a private key key'931*b*, and records it to the storage module 912. Note that a table identifier 932*a*="A" of the encrypted table A941, a column identifier 932*c*="a" of the column a, a table identifier 933*a*="B" of the encrypted table B942, and a column identifier 933*c*="b" of the column b are not the targets of encryption, respectively, so that those are stored to the storage module 952 along with the encrypted table A941 and the encrypted table B942 and also stored to the storage module 912 of the encrypted database client 910 at the same time.

FIG. 20 is an explanatory chart for describing functions of the encrypted table natural joining request unit 922 shown in FIG. 18 in more details. The encrypted table natural joining request unit 922 issues a natural joining request text 971 for giving a command to naturally join the encrypted table A941 and the encrypted table B942 by having the column a and the column b as the key based on the table identifier 932*a*="A" of the encrypted table A941, the column identifier 932*c*="a" of the column a, the table identifier 933*a*="B" of the encrypted table B942, and the column identifier 933*c*="b" of the column b, and transmits it to the encrypted database server 950. In the encrypted database server 950, the data receiving unit 964 upon receiving it operates the encrypted table natural joining unit 963 according to the natural joining request text 971.

FIG. 21 is an explanatory chart for describing functions of the encrypted table natural joining unit 963 shown in FIG. 18 in more details. The encrypted table natural joining unit 963 includes a decrypting function 963*a*, a natural joining function 963*b*, and a re-encrypting function 963*c*. The decrypting function 963*a* decrypts the data of the column a and the column b encrypted in the encrypted table A941 and the encrypted table B942 by using the public key pkey972*a* and the public key pkey'972*b* corresponding to the private key key931*a* and the private key key'931*b*, respectively, to return the tables to the table A932 and the table B933 which are in the state before being encrypted.

The natural joining function 963*b* performs natural joining of the table A932 and the table B933 by having the column a of the table A932 and the column b of the table B933 as the key according to the command given by the natural joining request text 971. The re-encrypting function 963*c* re-encrypts the column a (column b) as the key of the joined table A932 and the table B933, and returns the acquired encrypted table A×B981 to the encrypted database client 910. The public key pkey972*a* is used herein for the re-encryption. However, other encrypting keys may also be used.

FIG. 22 is an explanatory chart showing an example of the table A932 before being encrypted by the encrypted database management device 910 shown in FIG. 18. In the example shown in FIG. 22, the corresponding relation between the card numbers corresponding to the respective user names are shown by setting the first column 932*a* of the table A932 as "user names" and the second column 932*b* as "credit card numbers".

The encrypted database management device 910 encrypts the target data with an encryption function enc such as Hash function by using the private key "key" for the data to be concealed. FIG. 23 is an explanatory chart showing the encrypted table A941 that is in a state acquired by encrypting the table A932 shown in FIG. 22 done by the column encrypting unit 921 shown in FIG. 18. Here, the second column 932*b* "credit card numbers" is taken as the target to be concealed, and the data acquired by encrypting a plain text m with an encrypting key is expressed as enc (key, m).

The private key "key" is inherently given to each table. Encryption is definite, so that the value of enc (key, m) is uniquely determined when the plain text m and the private key "key" are settled. Note, however, that the encryption function enc is desirable to be an irreversible function such as a Hash function.

With this, even when the encrypted table A941 shown in FIG. 22 is leaked to the outside, the credit card number is not leaked unless the private key "key" is also leaked. Further, for the proper user having the private key "key", the table can be searched by using the credit card number. For example, when searching the user having the credit card number "12334", the search can be done by using enc (key, 12334).

As technical documents related thereto, there are following documents. Depicted in Patent Document 1 is an encrypting/decrypting device which can transmit/receive encrypted information containing key recovery information which can recover a decryption key even when the user loses the decryption key in transmission/reception of encrypted data. Depicted in Patent Document 2 is a natural joining high-speed calculation method which enables high-speed search of a table that is acquired by joining two tables.

Depicted in Patent Document 3 is a joining size evaluation method which is capable of decreasing the calculation cost required for performing equi-joining of databases. Depicted in Patent Document 4 is a database inquiry system which guides the user so that the user can generate a proper SQL text. Depicted in Patent Document 5 is an encryption system which certifies the uniformity of the plaintexts of a plurality of ciphertexts without disclosing private information through generating information series for certifying the plurality of ciphertexts. Depicted in Patent Document 6 is a database system which enables changes in the encrypting key and encryption algorithm during operation through further encrypting the generated encrypting key with another key.

Depicted in Non-Patent Document 1 is an existing technique regarding the encrypted database described above. Depicted in Non-Patent Document 2 is a typical content regarding a database including natural joining of tables.

Patent Document 1: Japanese Unexamined Patent Document 2000-267565

Patent Document 2: Japanese Unexamined Patent Document Hei 02-132559

Patent Document 3: Japanese Unexamined Patent Document Hei 10-124533

Patent Document 4: Japanese Patent Application Publication Hei 09-510565

Patent Document 5: Japanese Unexamined Patent Document Hei 11-065441

Patent Document 6: Japanese Unexamined Patent Document Hei 11-143780

Non-Patent Document 1: Paul Needham et al., "Oracle Advanced Security Technical White Paper", Oracle Japan, June 2007, "Searched Sep. 3, 2010", Internet <URL: http://otndnld.oracle.co.jp/products/database/oracle11g/pdf/twp_security_db_advancedsecurity__11gR1.pdf>

Non-Patent Document 2: Hiroyuki Kitagawa, "Database System", Shokodo, July 1996

With the database, not only necessary data is extracted from a vast amount of data but also a plurality of tables are joined frequently by SQL (Structured Query Language) commands and the like. Even for the encrypted data, it is naturally desired to be able to do calculations for performing natural joining of the tables easily without threatening the security.

However, the encrypting key "key" is given inherently to each table as described above, so that different encrypting keys are given to different tables. Thus, the same data on different tables become different data when encrypted with different encrypting keys. Therefore, in order to perform a calculation for joining different tables by having the data encrypted by the column encrypting unit 921 as the key by using the encrypted database management system 901 shown in FIG. 18, it is necessary to join the data by decrypting it once as described above.

This will be described more specifically. FIG. 24 is an explanatory chart regarding an example of a case where the encrypted database management device 901 shown in FIG. 18 performs a calculation for naturally joining a plurality of encrypted tables A941 and B942. FIG. 24A shows the encrypted table A941, FIG. 24B shows the encrypted table B942, and FIG. 24C shows an encrypted table A×B981, respectively. The encrypted table A941 shows the corresponding relation between each user and corresponding card numbers, in which the first column 932*a* is "user names" and the second column 932*b* is "credit card numbers". The second column 941*b* is encrypted by using the private key key931*a*. The encrypted table B942 shows the expiration dates of each card, in which the first column 933*a* is "credit card numbers" and the second column 933*b* is "credit card expiration dates". Further, the first column 942*a* is encrypted by using the private key key'931*b*.

When the administrator of the database wishes to know the corresponding relation between the "user names" and the "credit card expiration dates", the administrator issues the natural joining command text 971 by the encrypted table natural joining request unit 922 to naturally join the encrypted table A941 and the encrypted table B942 by having the "credit card numbers" of the columns 941*b* and 942*a* as the key. By this processing, it is expected to acquire the encrypted table A×B981 which contains three columns, such as the first column 981*a* "user names", the second column 981*b* "credit card numbers", and the third column 981*c* "credit card expiration dates".

However, the encrypted table A941 and the encrypted table B942 are encrypted with the different private keys key931*a* and key'931*b*, so that the data thereof are different data because of the different encrypting keys even the data at the stage of being in plaintexts are the same data. Thus, the encrypted table natural joining unit 963 cannot use the encrypted data directly as the key for natural joining. In order to perform this processing, it is necessary to perform processing for decrypting the columns 941*b* and 942*a* by the decrypting function 963*a* shown in FIG. 21.

For the processing, the public keys pkey'972*a* and pkey'972*b* corresponding to the respective private keys key931*a* and key'931*b* for the encrypted table A941 and the encrypted table B942 are required. By using the public keys, it is possible to decrypt the columns 941*b* and 942*a* for performing the processing. However, during the processing, the decrypted plaintext data is stored in the device, so that there may be a risk of having leakages of the plaintext data during that time.

FIG. 25 is an explanatory chart regarding an example of performing a calculation for naturally joining an encrypted table C1001 and an encrypted table D1002 encrypted by utilizing key=key', i.e., the same encrypting key "key", in order to overcome the foregoing issues. FIG. 25A shows the encrypted table C1001, the FIG. 25B shows the encrypted table D1002, and FIG. 25C shows an encrypted table C×D1003, respectively. This encrypting key may be of a public key type or of a common key type.

The encrypted table C1001 shows the corresponding relation between each user and corresponding card numbers, in which the first column 1001*a* is "user names" and the second column 1001*b* is "credit card numbers". The second column 1001*b* is encrypted by using the encrypting key "key". The encrypted table D1002 shows the expiration dates of each card, in which the first column 1002*a* is "credit card numbers" and the second column 1002*b* is "blacklist registered dates". Further, the first column 1002*a* is encrypted by using the same encrypting key "key" as that of the table C1001.

When the encrypting key "key" is the same, the data after being encrypted are the same provided that the data before being encrypted regarding the second column 1001*b* of the encrypted table C1001 and the first column 1002*a* of the encrypted table D1002 are the same. Therefore, it is possible to acquire the encrypted table C×D1003 by naturally joining the encrypted table C1001 and the encrypted table D1002 directly without utilizing the decrypting function 963*a*. However, at the same time, this means that even an improper user who does not have the encrypting key "key" can perform the processing for acquiring the encrypted table C×D1003 by naturally joining the encrypted table C1001 and the encrypted table D1002 by having the encrypted data as the key. This is not desirable for managing the encrypted database.

That is, desired is an encrypted database management device with which a plurality of tables by having the encrypted data as the key can be naturally joined by the user who has the proper encrypting key without performing processing for decrypting the encrypted data but with which the encrypted data cannot be naturally joined by illegitimate users who do not have the proper encrypting key. In addition, it is also required to suppress a large increase in the calculation amount for performing the processing since the database handles a vast amount of data.

Each of the above-described Patent Documents and Non-Patent Documents is not designed to overcome such issue, so that techniques capable of overcoming such issue are not depicted therein naturally.

An object of the preset invention is to provide an encrypted database management system, a client, a server, a natural joining method, and a program thereof, which are capable of naturally joining a plurality of tables of an encrypted database by having the encrypted data as the key without performing processing for decrypting each element of the data and without largely increasing the calculation amount.

DISCLOSURE OF THE INVENTION

In order to achieve the foregoing object, the encrypted database management system according to the present invention is an encrypted database system constituted with a client terminal and an encrypted database server mutually connected to each other, wherein: the client terminal includes a storage module which stores in advance an encrypting key as well as a first and a second group generators constituting a main part of the encrypting key, a column encrypting unit which encrypts data of a column indicated by a first label of a first table inputted from outside with the encrypting key and the first group generator, encrypts data of a column indicated by a second label of a second table inputted from outside with the encrypting key and the second group generator, and outputs the encrypted first and second tables to the outside, an intra-label projection request unit which generates a first intra-label key from the encrypting key and the first label, generates a second intra-label key from the encrypting key and the second label, and outputs the first and second intra-label keys to the outside, and an inter-label projection request unit which generates a first inter-label projection key from the encrypting key, the first group generator, and the first and second intra-label keys, generates a second inter-label projection key from the encrypting key, the second group generator, and the first and second intra-label keys, and outputs the first and second inter-label projection keys to the outside; and the encrypted database server includes a data receiving unit which receives and stores the encrypted first and second tables, and receives the first and second intra-label keys as well as the first and second inter-label projection keys, an intra-label projection unit which generates a first intra-label comparison value by having the first label and the first intra-label key worked on the data of the column indicated by the first label of the encrypted first table, and generates a second intra-label comparison value by having the second label and the second intra-label key worked on the data of the column indicated by the second label of the encrypted second table, an inter-label projection unit which generates a first inter-label comparison value which generates a first inter-label comparison value by having the first inter-label projection key worked on the first intra-label comparison value, and generates a second inter-label comparison value which generates a second inter-label comparison value by having the second inter-label projection key worked on the second intra-label comparison value, and an encrypted table natural joining unit which executes natural joining on the encrypted first and second tables by utilizing the outputted first and second inter-label comparison values.

In order to achieve the foregoing object, the client terminal according to the present invention is a client terminal which constitutes an encrypted database system by being mutually connected to an encrypted database server, and the client terminal is characterized to include: a storage module which stores in advance an encrypting key as well as a first and a second group generators constituting a main part of the encrypting key; a column encrypting unit which encrypts data of a column indicated by a first label of a first table inputted from outside with the encrypting key and the first group generator, also encrypts data of a column indicated by a second label of a second table inputted from outside with the encrypting key and the second group generator, and outputs the encrypted first and second tables to the outside; an intra-label projection request unit which generates a first intra-label key from the encrypting key and the first label, generates a second intra-label key from the encrypting key and the second label, and outputs the first and second intra-label keys to the outside; and an inter-label projection request unit which generates a first inter-label projection key from the encrypting key, the first group generator, and the first and second intra-label keys, generates a second inter-label projection key from the encrypting key, the second group generator, and the first and second intra-label keys, and outputs the first and second inter-label projection keys to the outside.

In order to achieve the foregoing object, the encrypted database server according to the present invention is an encrypted database server which constitutes an encrypted database system by being mutually connected to a client terminal, and the encrypted database server is characterized to include: a data receiving unit which receives and stores a first table where a column indicated by a first label is encrypted and a second table where a column indicated by a second label is encrypted, which are transmitted from the client terminal, and receives a first and a second intra-label keys as well as a first and a second inter-label projection keys transmitted from the client terminal; an intra-label projection unit which generates a first intra-label comparison value by having the first label and the first intra-label key worked on data of the column indicated by the first label of the encrypted first table, and generates a second intra-label comparison value by having the second label and the second intra-label key worked on data of the column indicated by the second label of the encrypted second table; an inter-label projection unit which generates a first inter-label comparison value by having the first inter-label projection key worked on the first intra-label comparison value, and generates a second inter-label comparison value by having the second inter-label projection key worked on the second intra-label comparison value; and an encrypted table natural joining unit which executes natural joining on the encrypted first and second tables by utilizing the outputted first and second inter-label comparison values.

In order to achieve the foregoing object, the natural joining method according to the present invention is used in an encrypted database system constituted with a client terminal and an encrypted database server mutually connected to each other, wherein: a column encrypting unit of the client terminal encrypts data of a column indicated by a first label of a first table inputted from outside with an encrypting key and a first group generator that constitutes a main part of the encrypting key stored in advance, and outputs it to the outside; the column encrypting unit of the client terminal encrypts data of a column indicated by a second label of a second table inputted from outside with the encrypting key and a second group generator that constitutes a main part of the encrypting key stored in advance, and outputs it to the outside; an intra-label projection request unit of the client terminal generates a first intra-label key from the encrypting key and the first label, and outputs it to the outside; the intra-label projection request unit of the client terminal generates a second intra-label key from the encrypting key and the second label, and outputs it to the outside; an inter-label projection request unit of the client terminal generates a first inter-label projection key from the encrypting key, the first group generator, and the first and second intra-label keys, and outputs it to the outside; the inter-label projection request unit of the client terminal generates a second inter-label projection key from the encrypting key, the second group generator, and the first and second intra-label keys, and outputs it to the outside; a data receiving unit of the encrypted database server receives the encrypted first and second tables, and receives the first and second intra-label keys as well as the first and second inter-label projection keys; an intra-label projection unit of the encrypted database server generates a first intra-label comparison value by having the first label and the first intra-label key worked on the data of the column indicated by the first label of the encrypted first table; the intra-label projection unit of the encrypted database server generates a second intra-label comparison value by having the second label and the second intra-label key worked on the data of the column indicated by the second label of the encrypted second table; an inter-label projection unit of the encrypted database server generates a first inter-label comparison value by having the first inter-label projection key worked on the first intra-label comparison value; the inter-label projection unit of the encrypted database server generates a second inter-label comparison value by having the second inter-label projection key worked on the second intra-label comparison value; and an encrypted table natural joining unit of the encrypted database server executes natural joining on the encrypted first and second tables by utilizing the first and second inter-label comparison values.

In order to achieve the foregoing object, the natural joining program according to the present invention is used in an encrypted database system constituted with a client terminal and an encrypted database server mutually connected to each other, and the program is characterized to cause a computer provided to the client terminal to execute: a procedure for encrypting data of a column indicated by a first label of a first table inputted from outside with an encrypting key and a first group generator that constitutes a main part of the encrypting key stored in advance, and outputting it to the outside; a procedure for encrypting data of a column indicated by a second label of a second table inputted from outside with the encrypting key and a second group generator that constitutes a main part of the encrypting key stored in advance, and outputting it to the outside, a procedure for generating a first intra-label key from the encrypting key and the first label, and outputting it to the outside; a procedure for generating a second intra-label key from the encrypting key and the second label, and outputting it to the outside; a procedure for generating a first inter-label projection key from the encrypting key, the first group generator, and the first and second intra-label keys, and outputting it to the outside; and a procedure for generating a second inter-label projection key from the encrypting key, the second group generator, and the first and second intra-label keys, and outputting it to the outside.

In order to achieve the foregoing object, the other natural joining program according to the present invention is used in an encrypted database system constituted with a client terminal and an encrypted database server mutually connected to each other, and the program is characterized to cause a computer provided to the encrypted database server to execute: a procedure for receiving the encrypted first and second tables, the first and second intra-label keys as well as the first and second inter-label projection keys; a procedure for generating a first intra-label comparison value by having the first label and the first intra-label key worked on data of a column indicated by the first label of the encrypted first table; a procedure for generating a second intra-label comparison value by having the second label and the second intra-label key worked on data of a column indicated by the second label of the encrypted second table; a procedure for generating a first inter-label comparison value by having the first inter-label projection key worked on the first intra-label comparison value; a procedure for generating a second inter-label comparison value by having the second inter-label projection key worked on the second intra-label comparison value; and a procedure for executing natural joining on the encrypted first and second tables by utilizing the first and second inter-label comparison values.

The present invention is structured to generate the intra-label key and inter-label key from the encrypting key and the label showing the columns as the target of joining on the client terminal side and to transmit those to the encrypted database server as described above. Thus, it is possible to judge whether or not the data of the columns designated in the first table and the second table are equivalent only by the encrypted database server that has received the intra-label key and the inter-label key.

This makes it possible to provide the excellent encrypted database management system, client, server, natural joining method, and program thereof, which are characterized to be capable of naturally joining a plurality of tables of an encrypted database by having the encrypted data as the key without performing processing for decrypting each element of the data and without largely increasing the calculation amount.

BRIEF DESCRIPTION OF THE DRAWINGS

FIGS. 2A and 2B are explanatory charts for describing a table A and a table B shown in FIG. 1 in more details, in which FIG. 2A shows the table A and FIG. 2B shows the table B;

FIGS. 5A and 5B are explanatory charts showing encrypted tables A and B on which encryption is completed by the processing shown in FIG. 4, in which FIG. 5A shows the encrypted table A and FIG. 5B shows the encrypted table B;

FIG. 22 is an explanatory chart showing an example of the table A before being encrypted in the encrypted database management device shown in FIG. 18;

FIG. 23 is an explanatory chart showing the encrypted table A in a state where the table A shown in FIG. 22 is encrypted by the column encrypting unit shown in FIG. 18;

FIGS. 24A-24C are explanatory charts showing an example of a case where the encrypted database management device shown in FIG. 18 performs a calculation for naturally joining a plurality of encrypted tables A and B, in which FIG. 24A shows the encrypted table A, FIG. 24B shows the encrypted table B, and FIG. 24C shows an encrypted table A×B; and FIGS. 25A-25C are explanatory charts regarding an example where a calculation is done for naturally joining an encrypted table C and an encrypted table D encrypted by utilizing key=key', i.e., the same encrypting key "key", in order to overcome the above-described issue, in which FIG. 25A shows the encrypted table C, FIG. 25B shows the encrypted table D, and FIG. 25C shows an encrypted table C×D.

BEST MODES FOR CARRYING OUT THE INVENTION

First Exemplary Embodiment

Figure 1:
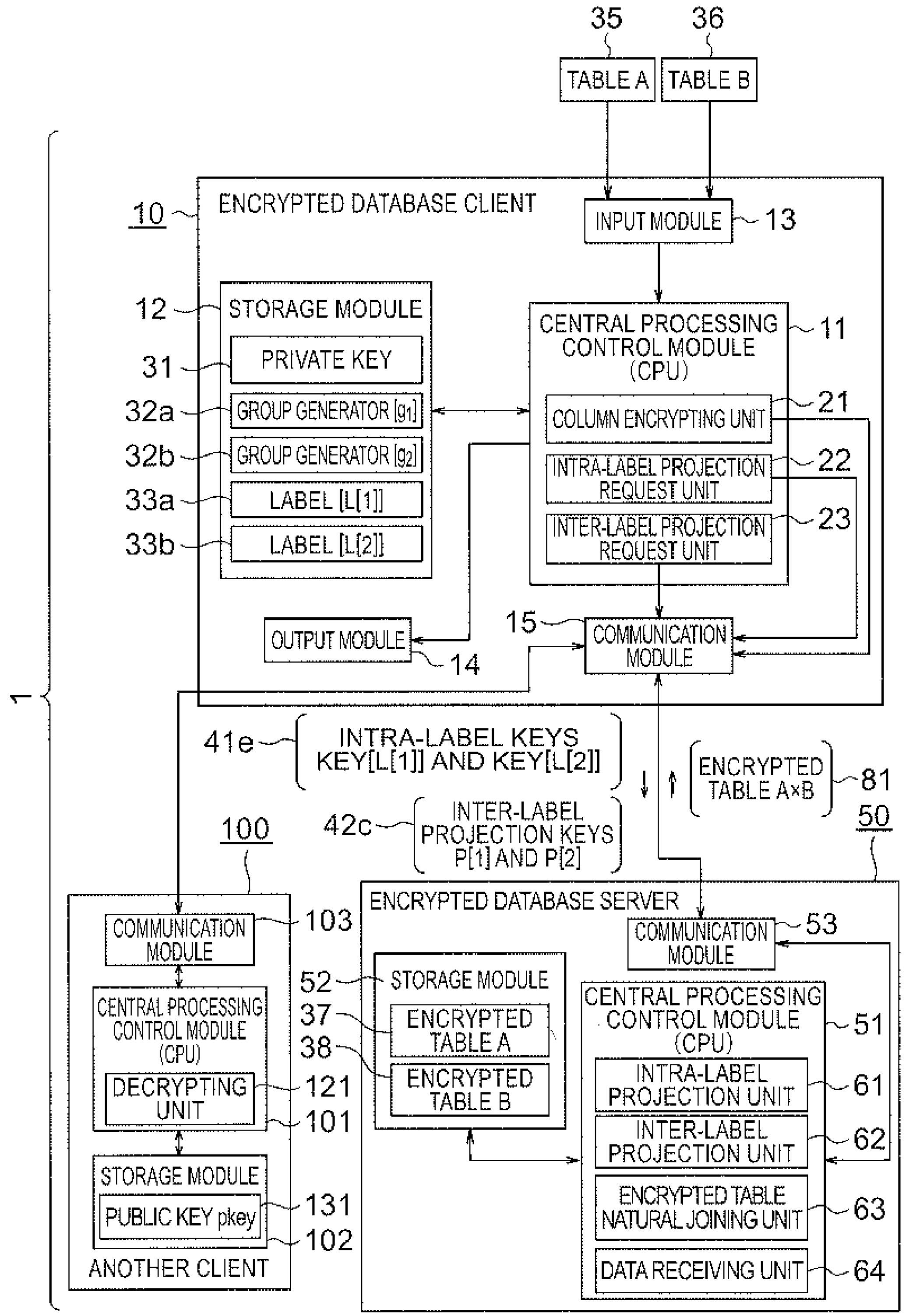
FIG. 1 is an explanatory chart showing the structure of an encrypted database management system according to the present invention.

Hereinafter, the structure of a first exemplary embodiment according to the present invention will be described by referring to the accompanying drawings FIGS. 1, 4, 7, 9, 11, 13 and 15. The basic contents of the exemplary embodiment will be described first, and more specific contents will be described thereafter.

An encrypted database system (an encrypted database management system 1) according to the exemplary embodiment is an encrypted database system which is constituted by mutually connecting a client terminal (an encrypted database client 10) and an encrypted database server 50. The client terminal (the encrypted database client 10) includes: a storage module 12 which stores an encrypting key (private key 31) and a first and a second group generators 32$a$ to $b$ in advance; a column encrypting unit 21 which encrypts the data in a column shown by a first label (label 33*a*) of a first table (table A35) inputted from outside with the encrypting key and the first group generator, encrypts the data in a column shown by a second label (label 33*b*) of a second table (table B36) inputted also from outside with the encrypting key and the second group generator, and outputs the encrypted first and second tables to the outside; an intra-label projection request unit 22 which generates a first intra-label key from the encrypting key and the first label, generates a second intra-label key from the encrypting key and the second label, and outputs the first and second intra-label keys to the outside; and an inter-label projection request unit 23 which generates a first inter-label projection key from the encrypting key, the first group generator, the first and second intra-label keys, generates a second inter-label projection key from the encrypting key, the second group generator, the first and second intra-label keys, and outputs the first and second inter-label projection keys to the outside. The encrypted database server 50 includes: a data receiving unit 64 which receives and stores the encrypted first and second tables, and receives the first and second intra-label keys as well as the first and the second inter-label keys; an intra-label projection unit 61 which generates a first intra-label comparison value by having the first label and the first intra-label key worked on the data in a column shown by the first label of the encrypted first table, and generates a second intra-label comparison value by having the second label and the second intra-label key worked on the data in a column shown by the second label of the encrypted second table; an inter-label projection unit 62 which generates a first inter-label comparison value by having the first inter-label projection key worked on the first intra-label comparison value, and generates a second inter-label comparison value by having the second inter-label projection key worked on the second intra-label comparison value; and an encrypted table natural joining unit 63 which executes natural joining of the encrypted first and second tables by using the outputted first and second inter-label comparison values.

Note here that the column encrypting unit 21 includes an inter-label key generating function 21*b* which generates an inter-label key from the private key and the label; a first label public key generating function 21*c* which generates a first label public key from the group generator and the inter-label projection key; a comparison value generating function 21*d* which generates a simple comparison value from the private key and the data of the column; a concealed comparison value generating function 21*e* which generates an intra-label key from the first label public key, the simple comparison value, and the inter-label key; an intra-label key generating function 21*a* which generates an intra-label key from the private key and the label; and an encrypting function 21*f* which encrypts the intra-label comparison value by the intra-label key and encrypts the data of the column by the private key at the same time.

Hereinafter, it will be explained in more detail.

Further, the intra-label projection request unit 22 includes an intra-label key generating function which generates an intra-label key from the private key and the first label. In the meantime, the inter-label projection request unit 23 includes: an inter-label projection key generating function 23*a* which generates an inter-label key from the private key and the second label; a second label public key generating function 23*b* which generates a second label public key from the group generator and the inter-label key; an interpolation value generating function 23*c* which generates an interpolation value from the first and second labels and the private key; and a projection key generating function 23*d* which generates an inter-label projection key from the second label public key and the interpolation value.

Further, the intra-label projection unit 61 includes an intra-label comparison value generating function 61*a* which generates a first and a second intra-label comparison values from the intra-label key and the encrypted column data of the encrypted first and second tables. In the meantime, the inter-label projection unit 62 includes an inter-label comparison value generating function 62*a* which takes the inter-label projection key and the first and second intra-label comparison values as input of bilinear mapping, and outputs the output thereof as the first and second inter-label comparison values, respectively.

With such structure, the encrypted database management system 1 can execute natural joining by having the encrypted data as the key without performing the processing for decrypting each element of data and without increasing the calculation amount greatly.

DEFINITIONS OF SYMBOLS AND THE LIKE

Symbols, terms, and definitions thereof used in this Description will be described. In lines other than numerical expressions in this Description, "A with superscript B (A to the power of B, for example)" is expressed as "KB", and "A with subscript B" is expressed as "A_B".

Note that "p" is a prime number. Each of "G__1", "G__2", and "G_T" is a cyclic group having the order "p", and "pair" is bilinear mapping of G__1×G__2 to G_T, "σ" is homomorphism from G__2 to G__1. As G__1, assumed is a group with which a Diffie-Hellman judging problem is difficult to be solved on that condition. For example, non-super-singular elliptic curves having bilinear mapping corresponds to such group. Note that g__1 is a generator of G__1, g__2 is a generator of G__2, and σ(g__2)=g__1.

"Hash" is mapping from a character string of an arbitrary length to a key space of "enc", and assumed is a cryptanalysis Hash function, and the like. "HashZ" is mapping from a character string of an arbitrary length to Z/pZ, and assumed is a cryptanalysis Hash function, and the like. "HashG" is mapping from a character string of an arbitrary length to G__1, and assumed is a cryptanalysis Hash function, and the like.

Note that "enc" is an encryption function having a key, an initial vector, and a plaintext as input and a ciphertext as output, while "dec" is a decryption function having a key, an initial vector, and a ciphertext as input and a plaintext as output. That is, provided that the private key, the public key corresponding thereto, the initial vector, the plaintext, and the ciphertext are "key", "pkey", "iv", "m", and "e", respectively, the relation thereof can be expressed as in following Expression 1.

Note here that the private key "key" and the public key "pkey" that corresponds to the private key are a pair of the public key and the private key of the public key encryption system. An encrypted text that is encrypted with the public key encryption system by using the private key "key" cannot be decrypted to acquire the plaintext by using keys other than the public key "pkey" that corresponds to the private key. Further, a ciphertext that is encrypted by using the public key "pkey" cannot be decrypted to acquire the plaintext by using keys other than the private key "key".

$$\text{Ciphertext } e=\text{enc}(\text{key},iv,m)$$

$$\text{Plaintext } m=\text{dec}(p\text{key},iv,e) \quad \text{(Expression 1)}$$

Each table of the database has a label which uniquely identifies itself among the tables belonging to each column.

Each column taken out from each table of the database is referred to as a column vector. To perform equi-joining of the table A and the table B of the database under a condition that "the element of the column a of the table A and the element of the column b of the table B are equivalent" is expressed as "to perform natural joining of the table A and the table B regarding the column a of the table A and the column b of the table B". Note here that the duplicating columns are omitted when performing the equi-joining.

(Structure of Devices)

FIG. 1 is an explanatory chart showing the structure of the encrypted database management system 1 according to the present invention. The encrypted database management system 1 is constituted by mutually connecting the encrypted database client 10 and the encrypted database server 50, and another client 100 via LAN (Local Area Network) or the like.

The encrypted database client 10 has the structure as a typical computer device. That is, the encrypted database client 10 includes: the central processing control module (CPU: Central Processing Unit) 11 as the main unit for executing computer programs; the storage module 12 for storing data; the input module 13 which accepts operations from the user; the output module 14 which presents processing results to the user; and the communication module 15 which performs data communications with other computers.

In the main computation control unit 11, the column encrypting unit 21, the intra-label projection request unit 22, and the inter-label projection request unit 23 are structured to execute respective functions to be described later as each of the computer programs in response to operation commands from the user. Further, the private key (key) 31 and the group generators 32*a* to *b* that are used in the processing to be described later are stored in the storage module 12. Further, the table A35 and the table B36 as the targets of natural joining as well as the labels 33*a* to *b* for identifying the tables and the columns as the targets of natural joining are inputted to the input module 13.

Among each of the group generators 32*a* to *b* and the labels 33*a* to *b*, the group generator and the label corresponding to the table A35 are the group generator 32*a* and the label 33*a* while those corresponding to the table 36B are the group generator 32*b* and the label 33*b*.

The encrypted database server 50 also has the structure as a typical computer device. That is, the encrypted database server 50 includes: a central processing control module (CPU: Central Processing Unit) 51 as the main unit for executing computer programs; a storage module 52 for storing data; and a communication module 53 which performs data communications with other computers.

In the main computation control unit 51, the intra-label projection unit 61, the inter-label projection unit 62, the encrypted table natural joining unit 63, and the data receiving unit 64 are structured to execute respective functions to be described later as each of the computer programs in response to operation commands from the encrypted database client 10. Further, an encrypted table A37 and an encrypted tale B38 acquired by encrypting the respective tables A35 and B36 received from the encrypted database client 10 by the data receiving unit 64 are stored in the storage module 52.

As the encrypting key used in the encrypted database client 10, it is possible to use a common key that is used in common for encryption and decryption. However, it is more desirable to use a private key of a public key encryption type in terms of the security. Thus, the private key (key) 31 is used in this exemplary embodiment. The private key (key) 31 is not transmitted to other devices from the encrypted database client 10. Further, a public key (pkey) 131 corresponding to the private key (key) 31 is transmitted only towards the another client 100 from the encrypted database client 10 but not transmitted to the encrypted database server 50.

The another client 100 includes the structure as a typical computer device as in the case of the encrypted database client 10 in terms of hardware, i.e., includes a central processing control module 101, a storage module 102, and a communication module 103. A decrypting unit 121 is operated by the central processing control module 101. As will be described later, the decrypting unit 121 decrypts the data encrypted by the column encrypting unit 21 of the encrypted database client 10 by using the public key (pkey) 131 that corresponds to the private key (key) 31. The public key (pkey) 131 is transmitted in advance from the encrypted database client 10 and stored in the storage module 102.

Note here that it is not specifically required to follow this case regarding physical divisions of the computer devices. For example, the column encrypting unit 21, the intra-label projection request unit 22, and the inter-label projection request unit 23 may be operated by computers different from each other. Furthermore, the column encrypting unit 21, the intra-label projection request unit 22, and the inter-label projection request unit 23, the intra-label projection unit 61, the inter-label projection unit 62, the encrypted table natural joining unit 63, and the data receiving unit 64 may all be operated by a same computer.

Figure 2A:
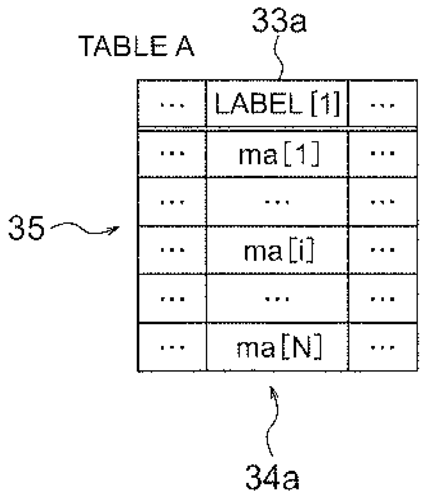
Figure 2B:
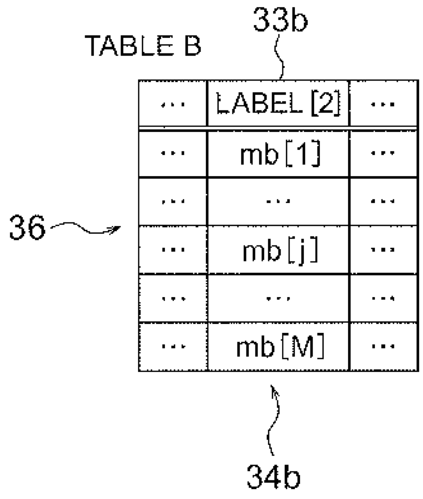

FIG. 2 is an explanatory chart for describing the table A35 and the table B36 shown in FIG. 1 in more details. FIG. 2A shows the table A35 and FIG. 2B shows the table B36, respectively. In the table A35, the label 33*a*=L[1] is given to the column as the target of natural joining. Similarly, in the table B36, the label 33*b*=L[2] is given to the column as the target of natural joining. The label herein is the data that can uniquely identify "a specific column of a specific table".

Here, it is so defined that the column data 34*a* as the target of encryption on the column shown by the label 33*a* in the table A35 is ma[i] (i is a natural number satisfying $1 \le i \le N$). Further, it is so defined that the column data 34*b* as the target of encryption on the column shown by the label 33*b* in the table B36 is mb[j] (j is a natural number satisfying $1 \le j \le M$).

(Encrypting Unit)

Figure 3:
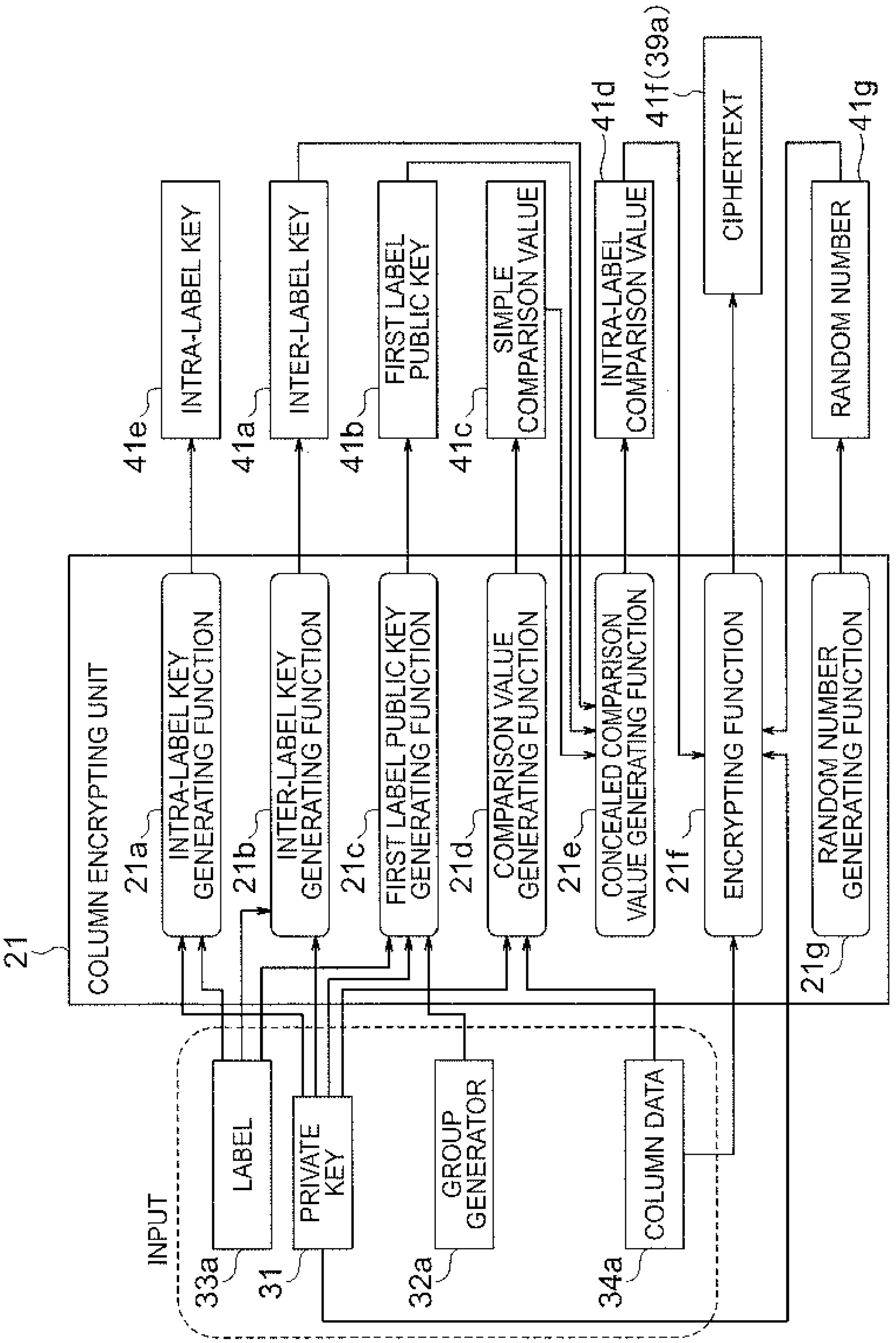
FIG. 3 is an explanatory chart showing the more detailed structures of an encrypted database client shown in FIG. 1 as an encrypting device.

FIG. 3 is an explanatory chart showing the more detailed structures of the encrypted database client 10 shown in FIG. 1 as the column encrypting device. The encrypted database client 10 functions as the column encrypting device for encrypting the column a of the table A when the column encrypting unit 21 operates by the central processing control module 11. The column encrypting unit 21 includes the intra-label key generating function 21*a*, the inter-label key generating function 21*b*, the first label public key generating function 21*c*, the comparison value generating function 21*d*, the concealed comparison value generating function 21*e*, the encrypting function 21*f*, and the random number generating function 21*g*. Details of each of those functions will be described later.

As the input data to the encrypting unit 21, the private key (key) 31 and the group generating element (g_1) 32*a* are stored in the storage module 12. The table A35 and the label 33*a*=L[1] shown in FIG. 2A are inputted from the input module 13. Only the processing for the table A35 is described with FIG. 3, so that the table B36 and the elements related thereto are not illustrated. Thus, the label 33*a*=L[1] will simply be referred herein as the label 33*a*=L except for the case where it is necessary to refer to the label 33*b*=L[2] that is given to the column of the table B36 as the target of natural joining. This also applies in the drawings used hereinafter.

Figure 4:
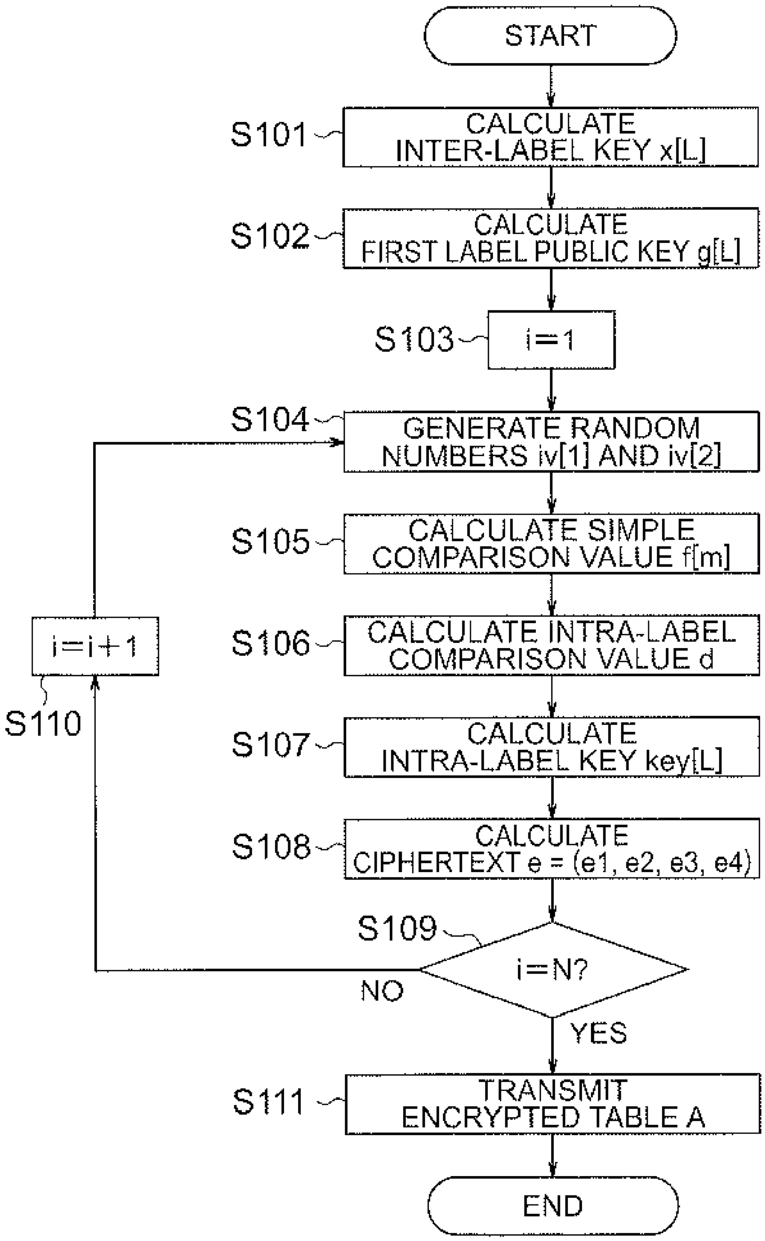
FIG. 4 is a flowchart showing processing done by an encrypting unit shown in FIG. 3.

FIG. 4 is a flowchart showing the processing done by the encrypting unit 21 shown in FIG. 3. The inter-label key generating function 21*b* calculates an inter-label key 41*a*=x[L] by the processing of Expression 2 shown below from the private key 31=key and the label 33*a*=L (step S101). Note here that a first element "secret" of the HashZ function is an arbitrary character string used for distinguishing the type of the processing. This is also the same for the HashZ function used in numerical expressions hereinafter.

$$\text{Inter-label key } x[L]=\text{Hash}Z(\text{"sec ret"},\text{key},L) \quad \text{(Expression 2)}$$

Subsequently, the first label public key generating function 21*c* calculates the first label public key 41*b*=g[L] by the processing of Expression 3 shown below from the public key 31=key, the group generator 32*a*=g_1, and the label 33*a*=L (step S102).

$$\text{First label public key } g[L]=g_1^{x[L]} \quad \text{(Expression 3)}$$

Note that i=1 is set as an initial value (step S103), and the random number generating function 21*g* randomly calculates random numbers (initial vectors) 41*g*=iv[1] and iv[2] from Z/qZ (step S104). Then, the comparison value generating function 21*d* calculates the simple comparison value 41*c*=f[m] by the processing of Expression 4 shown below from the private key 31=key and the column data 34*a*=m (step S105). In the flowchart of FIG. 4 hereinafter, the column data 34*a* of the i-th row, i.e., the column data 34*a*=ma[i], is simply expressed as the column data 34*a*=m.

$$\text{Simple comparison value } f[m]=\text{Hash}Z(\text{"value"},\text{key},m) \quad \text{(Expression 4)}$$

Subsequently, the concealed comparison value generating function 21*e* calculates the intra-label comparison value 41*d*=d by the processing of Expression 5 shown below from the inter-label key 41*a*, the first label public key 41*b*, and the simple comparison value 41*c* (step S106).

$$\text{Intra-label comparison value } d=g[L]^{f[m]} \quad \text{(Expression 5)}$$

In parallel to the processing described above, the intra-label key generating function 21*a* calculates the intra-label key 41*e*=key[L] by the processing of Expression 6 shown below from the private key 31=key and the label 33*a*=L (step S107).

$$\text{Intra-label key key}[L]=\text{Hash}(\text{"label key"},\text{key},L) \quad \text{(Expression 6)}$$

At last, the encrypting function 21*f* calculates the ciphertext 41*f*=e[i]: =(e[1], e[2], e[3], e[4]) by the processing of Expression 7 shown below from the private key 31=key, the column data 34*a*=m, the intra-label comparison value 41*d*, and the above-described random numbers 41*g*=iv[1] and iv[2] (step S108).

$$\textit{Ciphertext } e=(e[1],e[2],e[3],e[4]) = \begin{pmatrix} enc(\text{key}[L],iv[1],d), \\ iv[1],enc(\text{key},iv[2],m),iv[2] \end{pmatrix} \quad \text{(Expression 7)}$$

The encrypting unit 21 judges whether or not the value of i has reached the number of all the rows "N" of the table A35 (step S109). When judged that it has reached, the encrypting unit 21 outputs the encrypted table A37 on which the processing is completed to transmit it to the encrypted database server 50 via the communication module 15 (step S111), and ends the processing. When the value of i has not reached "N", the value of i is incremented by 1 (step S110) and the processing of steps S103 to 108 is repeated. Then, the encrypting unit 21 outputs the encrypted table A37 and, at the same time, the encrypting function 21*f* stores the label 33*a*=L to the storage module 12.

Figure 5A:
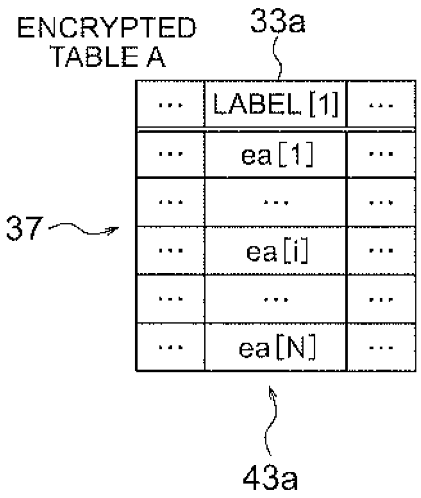
Figure 5B:
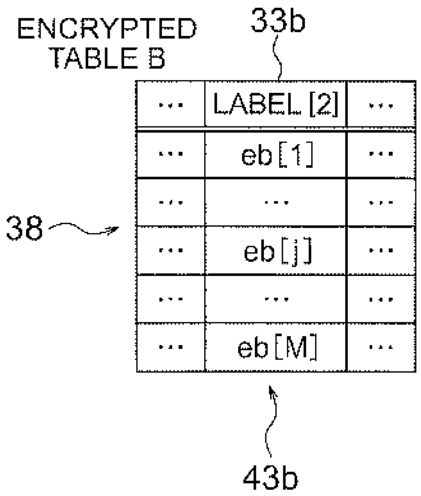

FIG. 5 is an explanatory chart showing the encrypted table A37 and the encrypted table 37B on which encryption is completed by the processing shown in FIG. 4. FIG. 5A shows the encrypted table A37 and FIG. 5B shows the encrypted table B38, respectively. In the encrypted table A37, each of the column data 34*a*=ma[i] is replaced with the ciphertext 41*f*(39*a*)=ea[i] having each of the elements shown in Expression 7. Similarly, in the encrypted table B38, each of the column data 39*b*=mb[j] is replaced with the ciphertext 41*f*(39*b*)=eb[j] having each of the elements shown in Expression 7.

Figure 6:
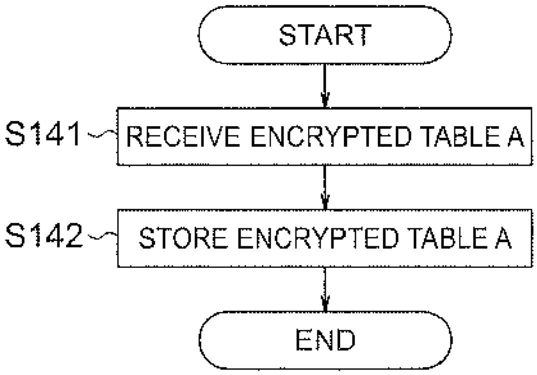
FIG. 6 is a flowchart showing actions of a data receiving unit of the encrypted database server for storing the encrypted table A.

FIG. 6 is a flowchart showing the action of the data receiving unit 64 of the encrypted database server 50 for storing the encrypted table A37. The data receiving unit 64 stores the encrypted table A37 received via the communication module 53 (step S141) in the storage module 52 (step S142). Similarly, the encrypted table B38 is also received and stored in the storage module 52 as well.

(Decrypting Unit)

Figure 7:
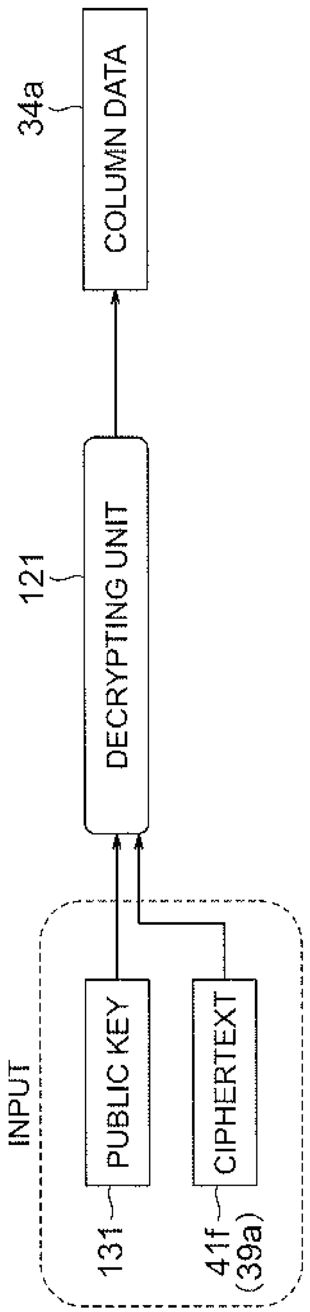
FIG. 7 is an explanatory chart showing the more detailed structure of another client shown in FIG. 1 as a decrypting device.

FIG. 7 is an explanatory chart showing the more detailed structure of the another client 100 shown in FIG. 1 as the decrypting device. The another client 100 functions as the decrypting device which decrypts the ciphertext 43*a*=ea[i] of the encrypted table A37 through operating the decrypting unit 121 by the central processing control module 11.

Figure 8:
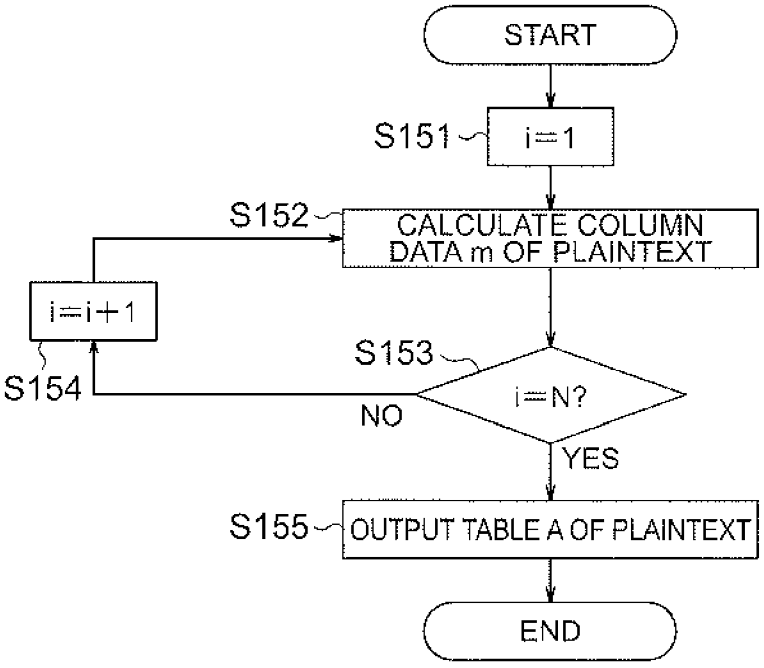
FIG. 8 is a flowchart showing processing of the decrypting device shown in FIG. 7.

FIG. 8 is a flowchart showing the processing of the decrypting unit 121 shown in FIG. 7. As the input data to the decrypting unit 121, the public key 131=pkey[L] corresponding to the private key 31=key[L] is stored in the storage module 102, and the latter half part=(e[3], e[4]) of the ciphertext 41*f*(39*a*) shown in Expression 7 is inputted via the communication module 103. The decrypting unit 121 performs initial setting as i=1 (step S151). Thereafter, the decrypting unit 121 repeats the processing (step S152) for calculating the plaintext column data 34*a*=m by the processing of Expression 8 shown below for all the rows based on the inputted data until it reaches i=N (steps S153 to 4), and outputs the result (step S155).

$$\text{Plaintext } m=\text{dec}(p\text{key}[L],e[4],e[3]) \quad \text{(Expression 8)}$$

(Intra-Label Projection Request Unit)

Figure 9:
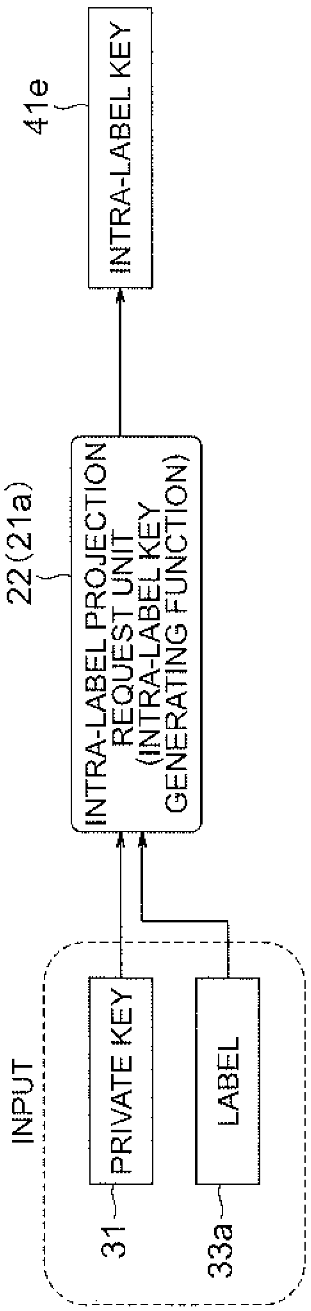
FIG. 9 is an explanatory chart showing the more detailed structure of the encrypted database client shown in FIG. 1 as an intra-label projection request device.

FIG. 9 is an explanatory chart showing the more detailed structure of the encrypted database client 10 shown in FIG. 1 as the intra-label projection request device. The encrypted database client 10 functions as the intra-label projection request device which generates a request text for requesting to compare the uniformity of the plaintexts encrypted under the same label and transmits it to the encrypted database server 50 through operating the intra-label projection request unit 22 by the central processing control module 11.

Figure 10:
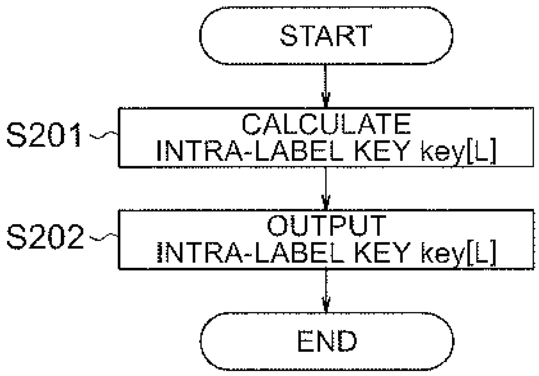
FIG. 10 is a flowchart showing processing of the intra-label projection request unit shown in FIG. 9.

FIG. 10 is a flowchart showing the processing of the intra-label projection request unit 22 shown in FIG. 9. As the input data to the intra-label projection request unit 22, the private key (key) 31 and the label 33*a*=L(L[1]) are stored in the storage module 12. The intra-label projection request unit 22 has the same function as the intra-label key generating function 21*a* of the encrypting unit 21 shown in FIG. 3, so that the same module within the program can be used in common.

The intra-label projection request unit 22 calculates the first intra-label key 41*e*=key[L] by the processing of Expression 9 shown below based on the input data (step S201), and outputs it towards the encrypted database server 50 (step S202). Note here that the first element "label key" of the Hash function of Expression 9 is an arbitrary character string for identifying the type of the processing.

$$\text{Intra-label key key}[L]=\text{Hash}(\text{“label key”},\text{key},L) \quad \text{(Expression 9)}$$

Similarly, the intra-label projection request unit 22 calculates the second intra-label key from the private key (key) 31 and the label 33*b*=L(L[2]), and also outputs it towards the encrypted database server 50.

(Inter-Label Projection Request Unit)

Figure 11:
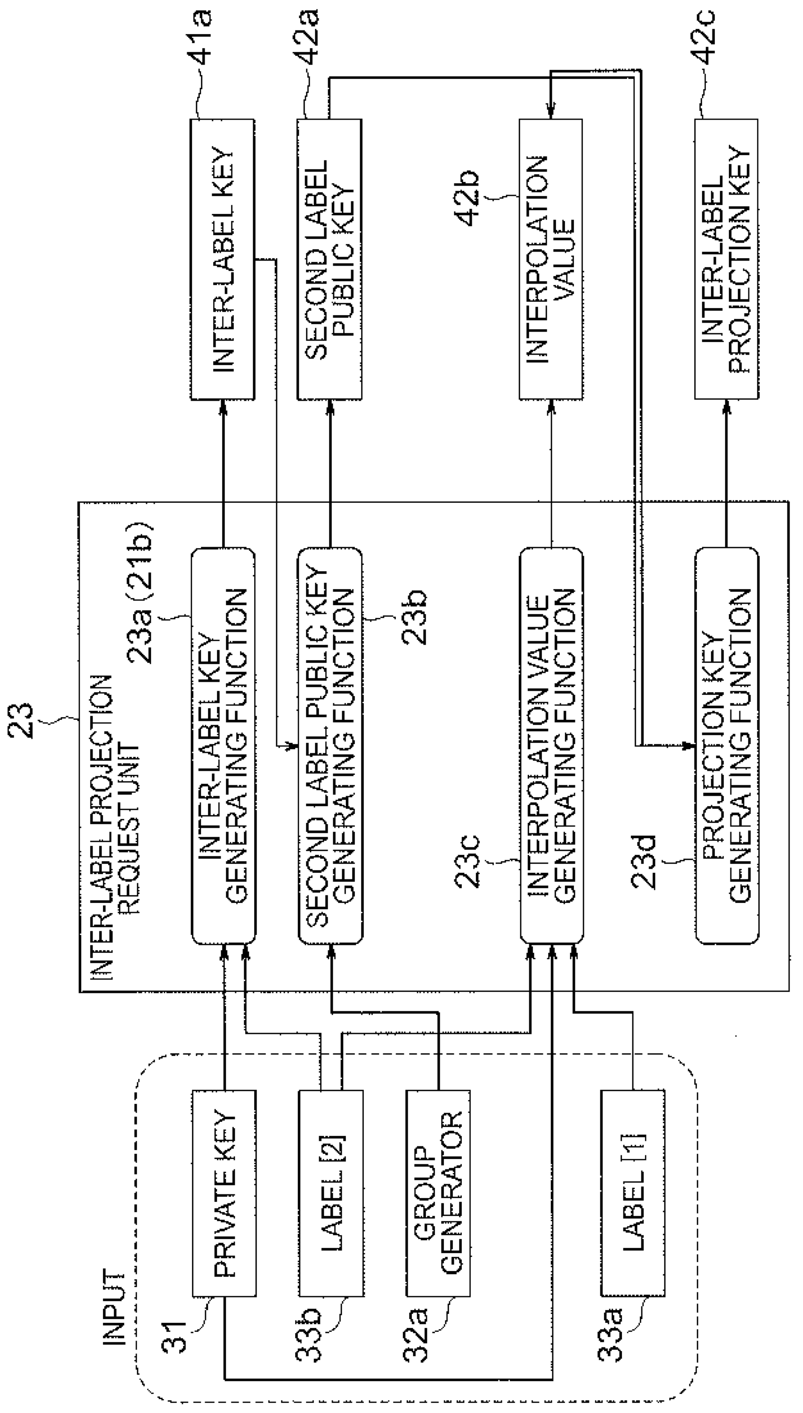
FIG. 11 is an explanatory chart showing the more detailed structure of the encrypted database client shown in FIG. 1 as an inter-label projection request device.

FIG. 11 is an explanatory chart showing the more detailed structure of the encrypted database client 10 shown in FIG. 1 as the inter-label projection request device. The encrypted database client 10 functions as the inter-label projection request device which generates a request text for requesting to compare the uniformity of the plaintexts encrypted under the different labels and transmits it to the encrypted database server 50 through operating the inter-label projection request unit 23 by the central processing control module 11.

The inter-label projection request unit 23 includes an inter-label projection key generating function 23*a*, a second label public key generating function 23*b*, an interpolation value generating function 23*c*, and a projection key generating function 23*d*. The details of each of those functions will be described later. As the input data to the inter-label projection request unit 23, the private key (key) 31 and the group generator (g_1) 32*a*, the label 33*a*=L[1], and the label 33*b*=L[2] are stored in the storage module 12.

Figure 12:
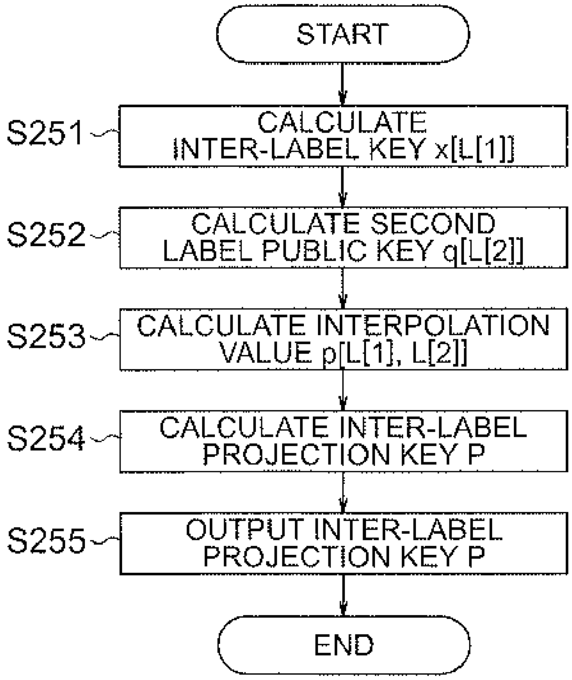
FIG. 12 is a flowchart showing processing of the inter-label projection request unit shown in FIG. 11.

FIG. 12 is a flowchart showing the processing of the inter-label projection request unit 23 shown in FIG. 11. The inter-label projection key generating function 23*a* calculates the inter-label key 41*a*=x[L[2]] by the processing of Expression 10 shown below from the private key 31=key and the label 33*a*=L[1] (step S251). The inter-label projection key generating function 23*a* has the same function as the intra-label key generating function 21*b* of the encrypting unit 21 shown in FIG. 3, so that the same module within the program can be used in common.

$$\text{Inter-label key } x[L[2]]=\text{Hash}Z(\text{“sec ret”},\text{key},L[2]) \quad \text{(Expression 10)}$$

Subsequently, the second label public key generating function 23*b* calculates the second label public key 42*a*=q[L[2]] by the processing of Expression 11 shown below from the private key 31=key, the group generator 32*a*=g_1, and the label 33*a*=L[1] (step S252).

$$\text{Second label public key } q[L[1]]=g_2^{x[L[2]]} \quad \text{(Expression 11)}$$

Subsequently, the interpolation value generating function 23*c* calculates the interpolation values 42*b*=p{L[1], L[2]} by the processing of Expression 12 shown below from the private key 31=key, the label 33*a*=L[1], and the label 33*b*=L[2] (step S253). Note here that {L[1], L[2]} is a character string rearranged L[1] and L[2] in order of the dictionary, and it is defined as {L[1], L[2]}={L[2], L[1]}.

$$\text{Interpolation value } p[L[1],L[2]]=\text{hash}Z(\text{“between”},\text{key},\{L[1],L[2]\}) \quad \text{(Expression 12)}$$

Subsequently, the projection key generating function 23*d* calculates the inter-label projection key 42*c*=P (the first inter-label projection key P[1]) by the processing of Expression 13 shown below from the second label public key 42*a*=q[L[2]], the inter-label key 41*a*=x[L[1]], and the interpolation value 42*b*=p{L[1], L[2]} (step S254), and outputs it towards the encrypted database server 50 (step S255).

$$\text{Intra-label projection key } P=q[L[1]]^{p[L[1],L[2]]} \quad \text{(Expression 13)}$$

Similarly, the inter-label projection request unit 23 calculates the second inter-label projection key P[2] from the private key (key) 31, the group generator (g_2) 32*b*, the label 33*b*=L[2], and the label 33*a*=L[1], and also outputs it towards the encrypted database server 50.

(Intra-Label Projection Unit)

Figure 13:
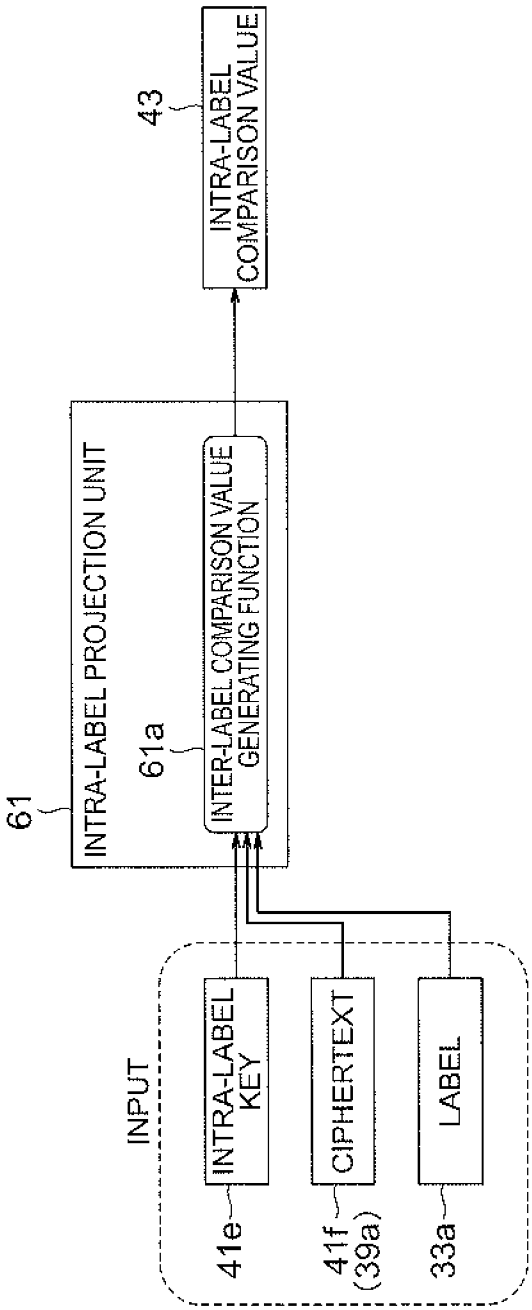
FIG. 13 is an explanatory chart showing the more detailed structure of the encrypted database server shown in FIG. 1 as an intra-label projection device.

FIG. 13 is an explanatory chart showing the more detailed structure of the encrypted database server 50 shown in FIG. 1 as the intra-label projection device. The encrypted database server 50 functions as the intra-label projection device which outputs an intra-label comparison value 43 for comparing the uniformity of the plaintexts encrypted under the different labels upon receiving the intra-label key 41*e* generated by the encrypted database client 10 through operating the intra-label projection request unit 61 by the central processing control module 51. The intra-label projection unit 61 includes an intra-label comparison value generating function 61*a*.

Figure 14:
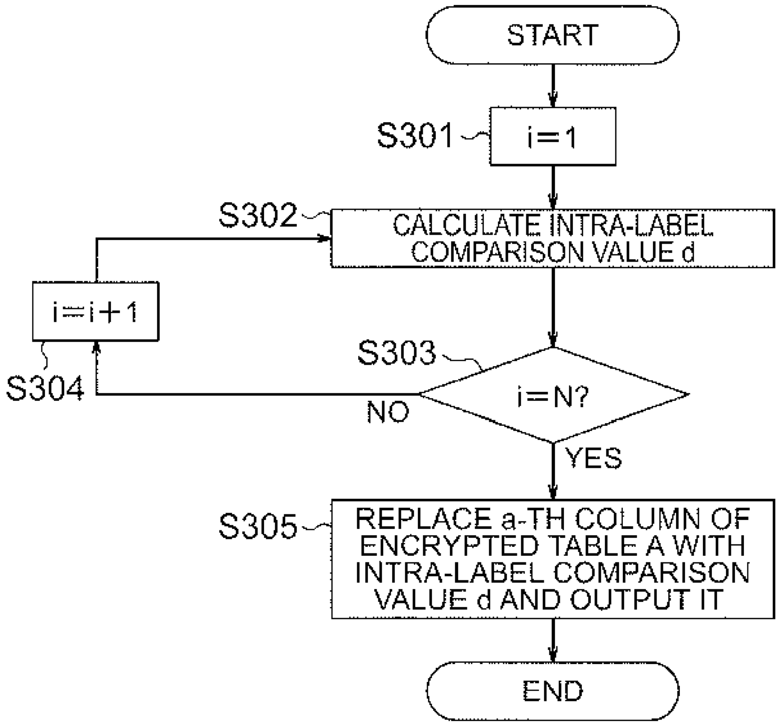
FIG. 14 is a flowchart showing processing of the intra-label projection request unit shown in FIG. 13.

FIG. 14 is a flowchart showing the processing of the intra-label projection unit 61 shown in FIG. 13. As the input data to the intra-label comparison value generating function 61*a*, the latter half part=(e[1], e[2]) of the ciphertext 41*f*, the label 33*a*=L(=L[1]), and the first intra-label key 41*e* are inputted from the encrypted database client 10.

The intra-label projection unit 61*a* of the intra-label projection unit 61 performs initial setting as i=1 (step S301). Thereafter, the intra-label projection unit 61 calculates the intra-label comparison value 43=d by the processing of Expression 14 shown below from the input data (step S302), repeats the processing for all the rows until it reaches i=N (steps S303 to 4), and outputs the matrix in which the value of the column corresponding to the label 33*a* (=L[1]) of the encrypted table A37 shown in FIG. 5 is replaced with the intra-label comparison value 43*d*=d (step S305) to give it to an inter-label projection unit 62 to be described later.

$$\text{Intra-label comparison value } d=\text{dec}(\text{key}[L],e[2],e[1]) \quad \text{(Expression 14)}$$

Similarly, the intra-label projection unit 61 outputs the matrix in which the value of the column corresponding to the label 33*b* (=L[2]) of the encrypted table B38 shown in FIG. 5 calculated from the latter half part=(e[1], e[2]) of the ciphertext 41*f*, the label 33*b* (=L[2]), and the second intra-label key is replaced with the intra-label comparison value, and gives it to the inter-label projection unit 62.

(Inter-Label Projection Unit)

Figure 15:
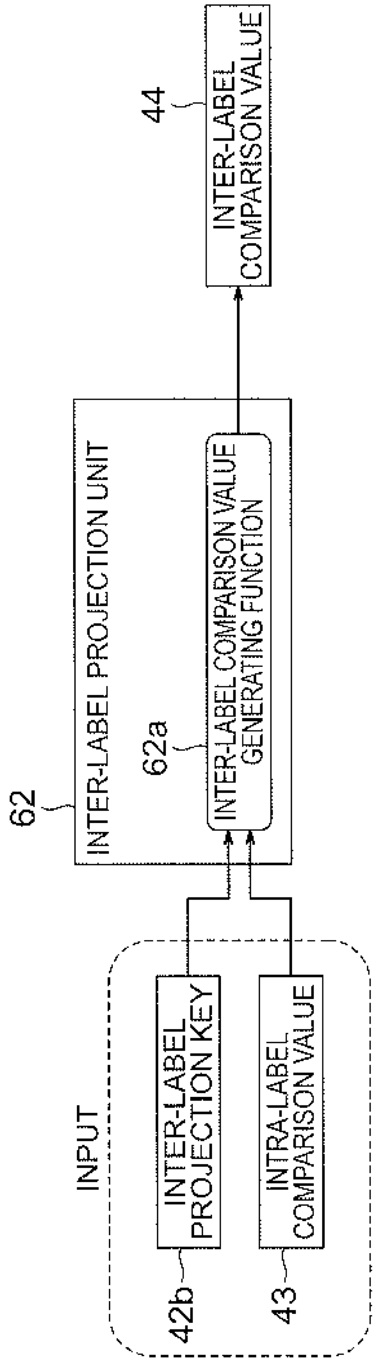
FIG. 15 is an explanatory chart showing the more detailed structure of the encrypted database server shown in FIG. 1 as an inter-label projection device.

FIG. 15 is an explanatory chart showing the more detailed structure of the encrypted database server 50 shown in FIG. 1 as the inter-label projection device. The encrypted database server 50 functions as the inter-label projection device which outputs an inter-label comparison value 44 for comparing the uniformity of the plaintexts encrypted under the different labels upon receiving the inter-label key 41*a*=x[L[1]] generated by the encrypted database client 10 through operating the inter-label projection unit 62 by the central processing control module 51. The inter-label projection unit 62 includes an inter-label comparison value generating function 62*a*.

Figure 16:
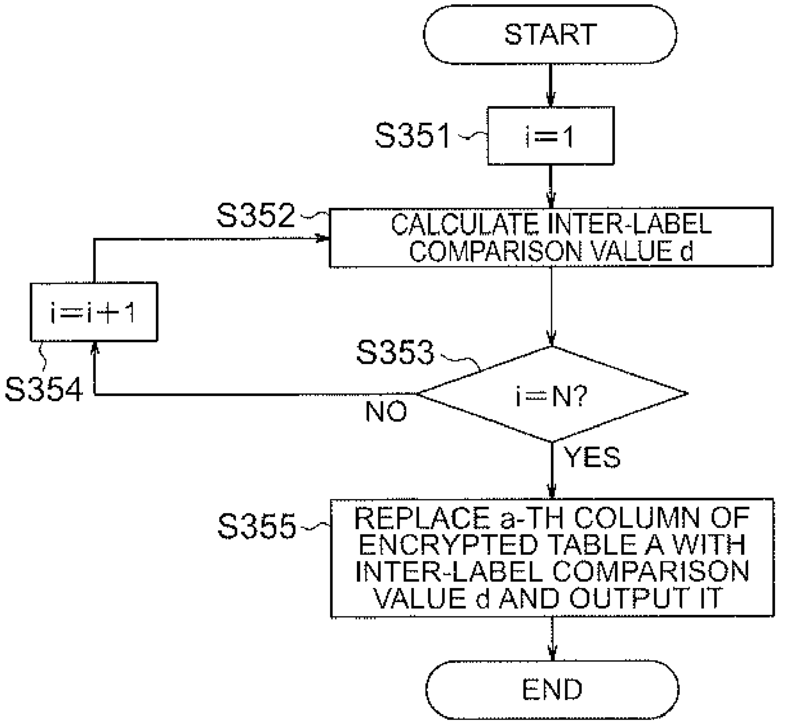
FIG. 16 is a flowchart showing processing of the inter-label projection unit shown in FIG. 15.

FIG. 16 is a flowchart showing the processing of the inter-label projection unit 62 shown in FIG. 15. As the input data to the inter-label comparison value generating function 62*a*, the inter-label projection key 42*c*=P(=P[1]) is inputted from the encrypted database client 10, and the matrix in which the value of the column corresponding to the label 33*a* (=L[1]) of the encrypted table A37 shown in FIG. 5 is replaced with the intra-label comparison value 43=d is also inputted from the intra-label projection unit 61.

The inter-label comparison value generating function 62*a* of the inter-label projection unit 62 performs initial setting as i=1 (step S351). Thereafter, the inter-label projection comparison value generating function 62*a* calculates the inter-label comparison value 44=h by the processing of Expression 15 shown below from the input data (step S352), repeats the processing for all the rows until it reaches i=N (steps S353 to 4), and outputs the matrix in which the value of the column corresponding to the label 33_a_ (=L[1]) of the encrypted table A37 shown in FIG. 5 is replaced with the inter-label comparison value 44=h (step S355) to give it to an encrypted table natural joining unit 63 to be described later.

$$\text{Inter-label comparison value } h=\text{pair}(d,P) \qquad \text{(Expression 15)}$$

Similarly, the intra-label projection unit 62 takes the inter-label projection key (=P[2]) inputted from the encrypted database client 10 and the matrix in which the value of the column corresponding to the label 33_b_ (=L[2]) of the encrypted table B38 shown in FIG. 5 is replaced with the intra-label comparison value as the input, and replaces the intra-label comparison value with the inter-label comparison value. The encrypted table natural joining unit 63 performs natural joining of the table A37 and the table B36 by using the value.

(Effects Achieved by Processing of Exemplary Embodiment)

The effects achieved by the processing shown heretofore will be described.

When the encrypting device encrypts the plaintext data m associated to the label L by using the private key "key", the ciphertext e shown in Expression 7 described above can be acquired. The latter half part (e[3], e[4]) of the ciphertext e is the stochastic ciphertext of the plaintext data m, so that there is no risk of having the information of m leaked therefrom. Further, the first half part (e[3], e[4]) of the ciphertext e is also the stochastic ciphertext of the plaintext data m, so that there is no risk of having the information of m leaked therefrom.

Needless to mention that the key "key[L]" used in Expression 7 cannot be acquired without the private key "key" used in the original encryption. Further, the another client 100 shown in FIG. 1 can simply decrypt the ciphertext e and acquire the plaintext data m through operating the decrypting unit 121 by the central processing control module 11.

The intra-label projection request unit 22 calculates the intra-label key 41_e_=key[L] shown in Expression 9 from the private key 31=key and the label 33_a_=L, and outputs it to the intra-label projection unit 61. The intra-label projection unit 61 upon receiving it calculates the intra-label comparison value 43=d shown in Expression 14. Regarding the intra-label comparison value 43=d, the relation shown in following Expression 16 applies.

$$\text{Intra-label comparison value } d=g[L]^{x[L]HashZ(\text{“value”},key,m)} \qquad \text{(Expression 16)}$$

Regarding the intra-label comparison value 43=d, the same intra-label comparison value 43=d is acquired necessarily from the same plaintext m provided that the label L is the same. Thus, it is possible to judge whether or not the plaintexts of the ciphertexts under the same label L match with each other (note that "the ciphertexts under the same label" are not compared in natural joining).

Subsequently, it is assumed that the label L[1] is given to the table A35 and the label L[2] is given to the table B36. It is assumed that the plaintext data m[1] of the column shown by the label L[1] of the table A35 is encrypted regarding the label L[1], and the plaintext data m[2] of the column shown by the label L[2] of the table B36 is encrypted regarding the label L[2]. Further, it is assumed that the intra-label keys 41_e_=key [L[1]] and key[L[2]] corresponding to each of those are calculated by the intra-label projection request unit 22 and outputted to the intra-label projection unit 61.

Even when each of the intra-label comparison values d[1] and d[2] shown in Expression 17 is acquired by letting those data go through the intra-label projection request unit 22 and the intra-label projection unit 61, the discrete logarithm of g[L[1]]^(x[L[1]]) and g[L[2]]^(x[L[2]]) is unknown in that state. Therefore, it is not possible to judge whether or not the plaintext data m[1] and m[2] are equivalent from the intra-label comparison values d[1] and d[2].

$$d[1]=g[L[1]]^{x[L[1]]HashZ(\text{“value”},key,m[1])}$$

$$d[2]=g[L[2]]^{x[L[2]]HashZ(\text{“value”},key,m[2])} \qquad \text{(Expression 17)}$$

Thus, in addition to those, the inter-label projection request unit 23 generates the inter-label projection keys P[1] and P[2] shown in following Expression 18 to 19 by using Expression 13 from the labels L[1] and L[2] and the private key=key.

$$\text{Inter-label projection key } P[1]=q[L[1]]^{p[L[1],L[2]]} \qquad \text{(Expression 18)}$$

$$\text{Inter-label projection key } P[2]=q[L[2]]^{p[L[2],L[1]]} \qquad \text{(Expression 19)}$$

When the intra-label comparison values d[1], d[2] and the inter-label projection keys P[1], P[2] are inputted to the inter-label projection unit 62, inter-label comparison values pair(d[1], P[1]) and pair(d[2], P[2]) are calculated by using operations of the bilinear mapping shown in following Expressions 20 to 21 with the processing shown in Expression 15 described above (step S351).

$$\begin{aligned}\text{pair}(d[1], P[1]) &= \text{pair}\left(g_1^{\times[L[1]]HashZ(\text{"value"},key,m[1]}, \; q[L[1]]^{p[L[1],L[2]]}\right) \\ &= \text{pair}(g_1, g_2)^{HashZ(\text{"value"},key,m[1])\times[L[1]]\times[L[2]]p[L[1],L[2]]}\end{aligned} \qquad \text{(Expression 20)}$$

$$\begin{aligned}\text{pair}(d[2], P[2]) &= \text{pair}\left(g_1^{\times[L[2]]HashZ(\text{"value"},key,m[2]}, \; q[L[2]]^{p[L[2],L[1]]}\right) \\ &= \text{pair}(g_1, g_2)^{HashZ(\text{"value"},key,m[2])\times[L[2]]\times[L[1]]p[L[2],L[1]]}\end{aligned} \qquad \text{(Expression 21)}$$

Note here that the relation shown in following Expression 22 applies. Therefore, it is possible to judge that the original plaintext data m[1] and m[2] are equivalent when the inter-label comparison values pair(d[1], P[1]) and pair(d[2], P[2]) are equivalent and that the original plaintext data m[1] and m[2] are not equivalent when the inter-label comparison values pair(d[1], P[1]) and pair(d[2], P[2]) are not equivalent.

$$\begin{aligned}p[L[1], L[2]] &= HashZ(\text{"between"}, \text{key}, \{L[1], L[2]\}) \\ &= HashZ(\text{"between"}, \text{key}, \{L[2], L[1]\}) \\ &= p[L[2], L[1]]\end{aligned} \qquad \text{(Expression 22)}$$

Figure 17:
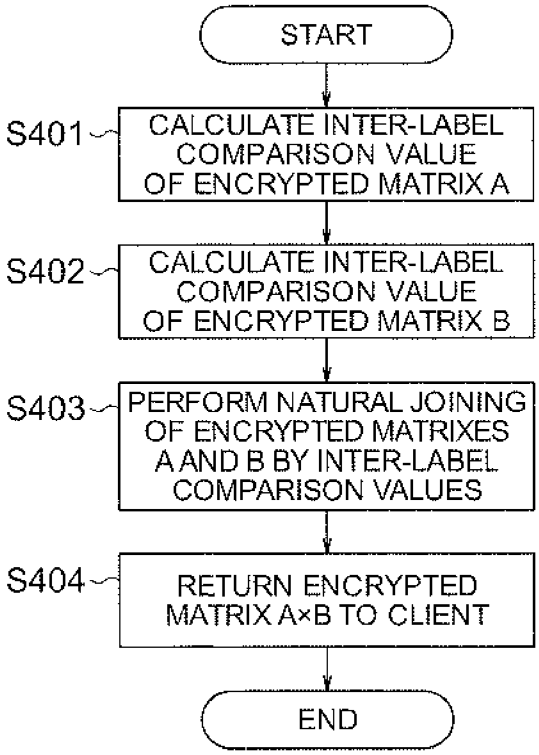
FIG. 17 is a flowchart showing processing of the encrypted table natural joining unit executed for performing natural joining of an encrypted table A and an encrypted table B.
Figure 18:
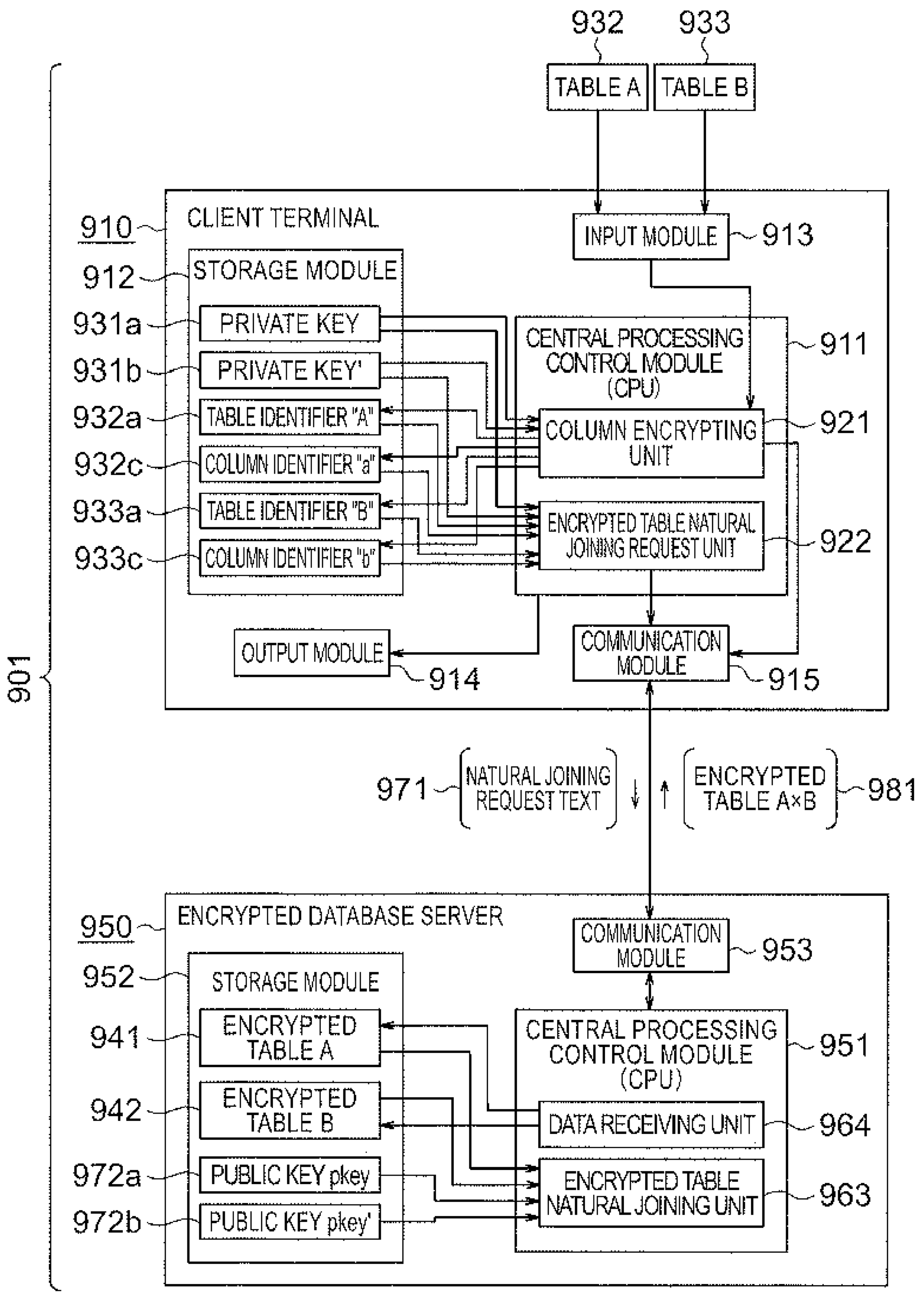
FIG. 18 is an explanatory chart showing the structure of an encrypted database management system according to a typical technique regarding an encrypted database.
Figure 19:
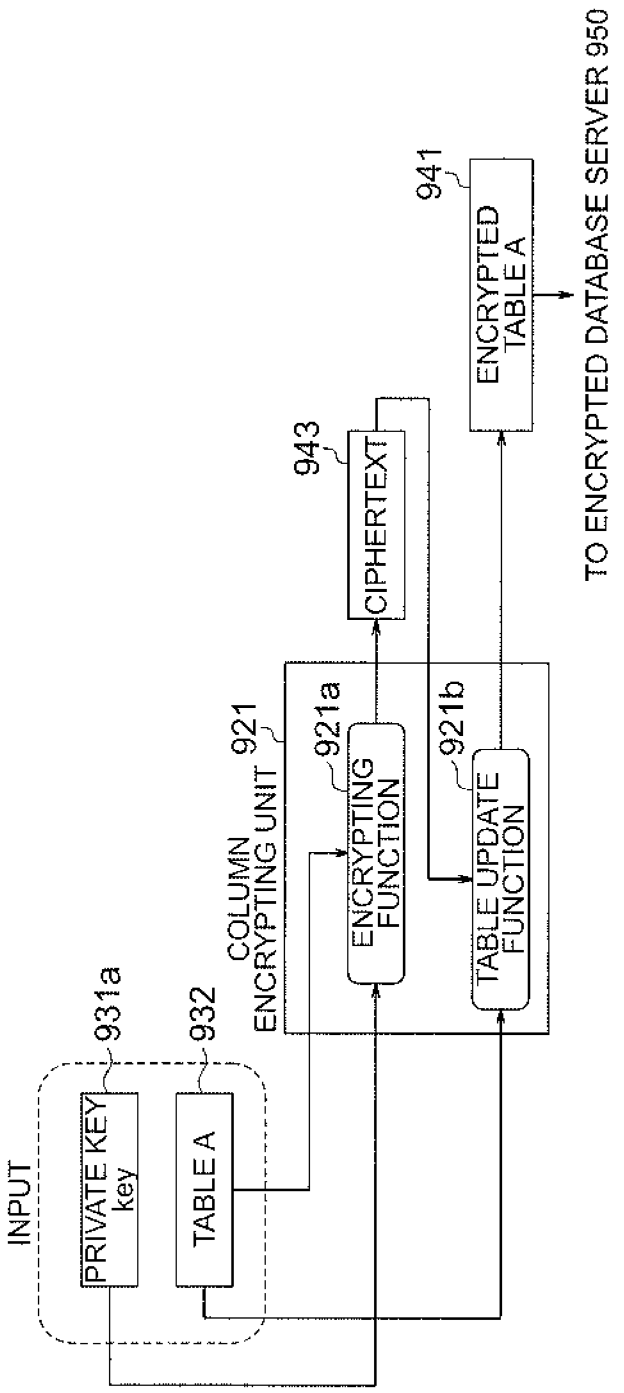
FIG. 19 is an explanatory chart for more specifically describing functions of a column encrypting unit shown in FIG. 18.
Figure 20:
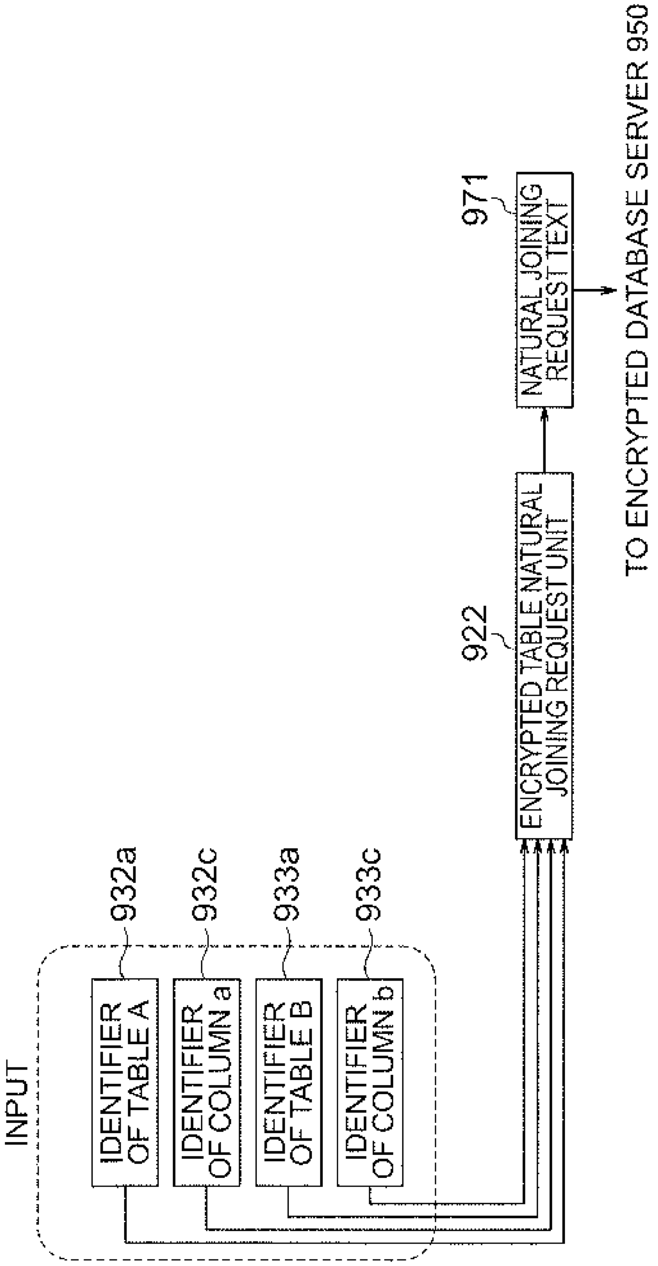
FIG. 20 is an explanatory chart for more specifically describing functions of the encrypted table natural joining request unit shown in FIG. 18.
Figure 21:
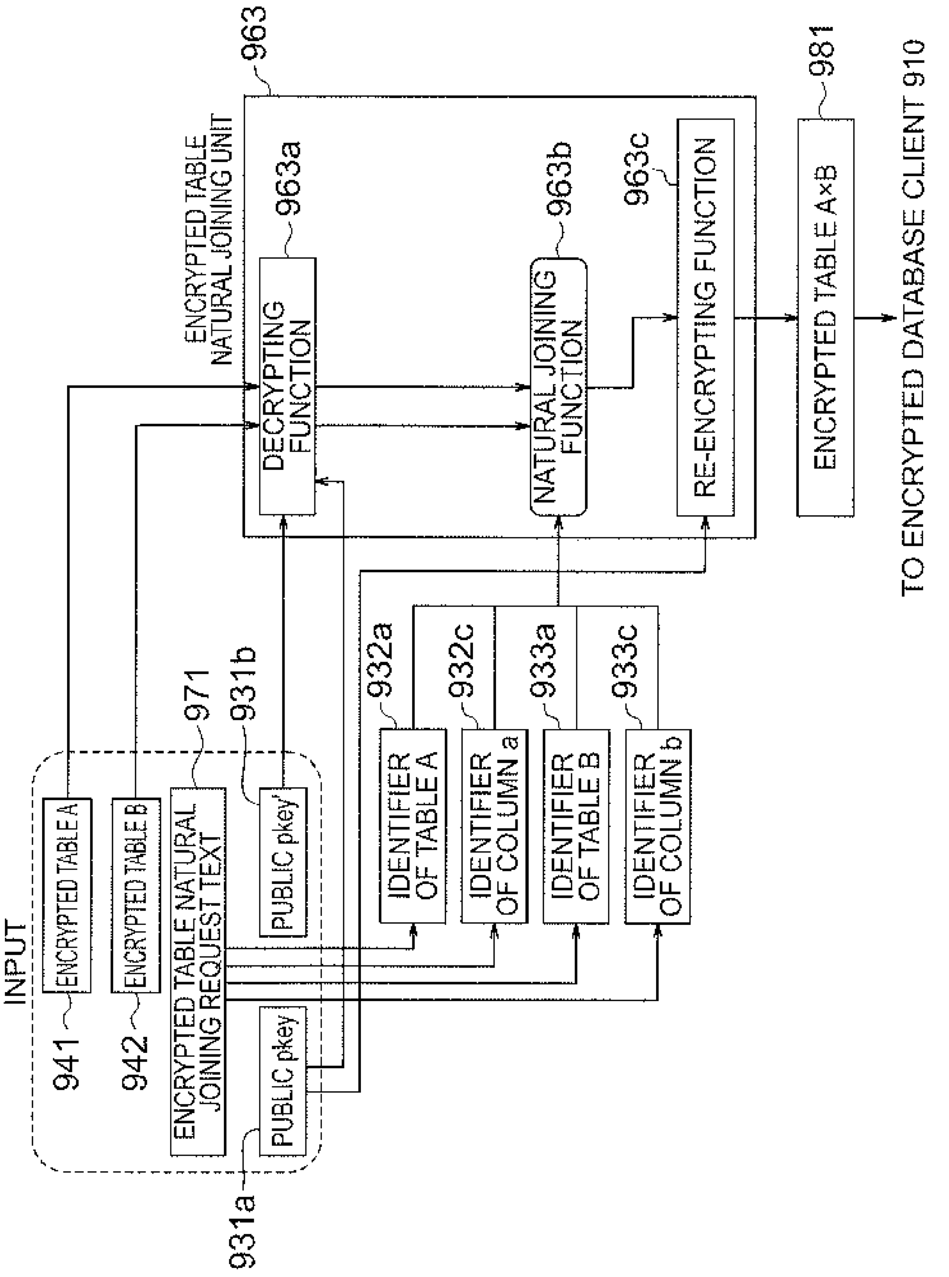
FIG. 21 is an explanatory chart for more specifically describing functions of the encrypted table natural joining request unit shown in FIG. 18.

FIG. 17 is a flowchart showing the processing of the encrypted table natural joining unit 63 for performing natural joining of the encrypted table A37 and the encrypted table B38. The encrypted table natural joining unit 63 lets the inter-label projection unit 62 perform the processing for calculating the inter-label comparison values of the encrypted table A37 (step S401) and the processing for calculating the inter-label comparison values of the encrypted table B38 subsequently (step S402). The specific processing done in steps S401 and 402 is shown in FIG. 14 and FIG. 16.

Then, the encrypted table natural joining unit 63 performs the natural joining processing of the encrypted table A37 and the encrypted table B38 by using the calculated inter-label comparison values h[1] and h[2] as the key (step S403), and returns the encrypted table A×B81 generated by performing natural joining to the encrypted database client 10 (step S404).

(Overall Actions of First Exemplary Embodiment)

Next, the overall actions of the above exemplary embodiment will be described. The natural joining method according to the exemplary embodiment is used in the encrypted database system 1 constituted with the client terminal and the encrypted database system mutually connected to each other, with which: the column encrypting unit of the client terminal encrypts the data of the column indicated by the first label of the first table inputted from outside with the encrypting key and the first group generator stored in advance, and outputs it to the outside (FIG. 4: steps S101 to 110); the column encrypting unit of the client terminal encrypts the data of the column indicated by the second label of the second table inputted from outside with the encrypting key and a second group generator stored in advance, and outputs it to the outside (FIG. 4: steps S101 to 110); the intra-label projection request unit of the client terminal generates the first intra-label key from the encrypting key and the first label, and outputs it to the outside (FIG. 10: steps S201 to 202); the intra-label projection request unit of the client terminal generates the second intra-label key from the encrypting key and the second label, and outputs it to the outside (FIG. 10: steps S201 to 202); the inter-label projection request unit of the client terminal generates the first inter-label projection key from the encrypting key, the first group generator, and the first and second intra-label keys, and outputs it to the outside (FIG. 11: steps S251 to 255); the inter-label projection request unit of the client terminal generates the second inter-label projection key from the encrypting key, the second group generator, and the first and second intra-label keys, and outputs it to the outside (FIG. 11: steps S251 to 255); the data receiving unit of the encrypted database server receives the encrypted first and second tables, and receives the first and second intra-label keys as well as the first and second inter-label projection keys (FIG. 6: steps S141 to 142); the intra-label projection unit of the encrypted database server generates the first intra-label comparison value by having the first label and the first intra-label key worked on the data of the column indicated by the first label of the encrypted first table (FIG. 14: steps S301 to 305); the intra-label projection unit of the encrypted database server generates the second intra-label comparison value by having the second label and the second intra-label key worked on the data of the column indicated by the second label of the encrypted second table (FIG. 14: steps S301 to 305); the inter-label projection unit of the encrypted database server generates the first inter-label comparison value by having the first inter-label projection key worked on the first intra-label comparison value (FIG. 16: steps S351 to 355); the inter-label projection unit of the encrypted database server generates the second inter-label comparison value by having the second inter-label projection key worked on the second intra-label comparison value (FIG. 16: steps S351 to 355); and the encrypted table natural joining unit of the encrypted database server executes natural joining on the encrypted first and second tables by utilizing the first and second inter-label comparison values (FIG. 17: step S403).

Note here that each of the above-described action steps may be put into a program that can be executed by a computer to have it executed by the encrypted database client 10 and the encrypted database server 50 as the computers which directly execute each of the steps. The program may be recorded to a non-transitory recording medium such as a DVD, a CD, or a flash memory. In that case, the program is read out from the recording medium by the computer and executed.

Through such actions, the exemplary embodiment can provide following effects.

It is possible with the exemplary embodiment to judge, regarding the encrypted data that cannot be compared with others in that state, whether or not the two plaintext data are equivalent by using the inter-label projection keys P[1] and P[2] without decrypting the data. This makes it possible to achieve the encrypted database system capable of performing natural joining of the data. Natural joining is the processing that is frequently done in the database. Therefore, to be able to execute natural joining without decrypting the data means to be able to decrease the risk of having the confidential information leaked from the database.

The data processing amount required at that time is simply proportional to the data amount of the two columns that are the targets of comparison. That is, there is no great increase in the processing amount such as "being proportional to a square of the data amount".

Further, "label" indicating the column as the target of natural joining is the data that can uniquely identify "a specific column of a specific table". Thus, it is not necessary to give identifiers to "table" and "column", respectively, for performing the processing of natural joining. Therefore, the processing can be simplified further, so that it can be applied in a wider range of purposes.

While the present invention has been described above by referring to the specific embodiments shown in the drawings, the present invention is not limited only to the embodiments described above. Any other known structures can be employed, as long as the effects of the present invention can be achieved therewith.

Regarding each of the embodiments described above, the new technical contents of the above-described embodiments can be summarized as follows. While a part of or a whole part of the embodiments can be summarized as follows as the new techniques, the present invention is not necessarily limited only to the followings.

(Supplementary Note 1)

An encrypted database system constituted with a client terminal and an encrypted database server mutually connected to each other, wherein:

the client terminal includes a storage module which stores in advance an encrypting key as well as a first and a second group generators constituting a main part of the encrypting key, a column encrypting unit which encrypts data of a column indicated by a first label of a first table inputted from outside with the encrypting key and the first group generator, encrypts data of a column indicated by a second label of a second table inputted from outside with the encrypting key and the second group generator, and outputs the encrypted first and second tables to the outside, an intra-label projection request unit which generates a first intra-label key from the encrypting key and the first label, generates a second intra-label key from the encrypting key and the second label, and outputs the first and second intra-label keys to the outside, and an inter-label projection request unit which generates a first inter-label projection key from the encrypting key, the first group generator, and the first and second intra-label keys, generates a second inter-label projection key from the encrypting key, the second group generator, and the first and second intra-label keys, and outputs the first and second inter-label projection keys to the outside; and the encrypted database server includes a data receiving unit which receives and stores the encrypted first and second tables, and receives the first and second intra-label keys as well as the first and second inter-label projection keys, an intra-label projection unit which generates a first intra-label comparison value by having the first label and the first intra-label key worked on the data of the column indicated by the first label of the encrypted first table, and generates a second intra-label comparison value by having the second label and the second intra-label key worked on the data of the column indicated by the second label of the encrypted second table, an inter-label projection unit which generates a first inter-label comparison value by having the first inter-label projection key worked on the first intra-label comparison value, and generates a second inter-label comparison value which generates a second inter-label comparison value by having the second inter-label projection key worked on the second intra-label comparison value, and an encrypted table natural joining unit which executes natural joining on the encrypted first and second tables by utilizing the outputted first and second inter-label comparison values.

(Supplementary Note 2)

The encrypted database system as depicted in Supplementary Note 1, wherein the column encrypting unit includes:

an inter-label key generating function which generates an inter-label key from the private key and the label;

a first label public key generating function which generates a first label public key from the group generator and the inter-label projection key;

a comparison value generating function which generates a simple comparison value from the private key and the column data;

a concealed comparison value generating function which generates an intra-label comparison value from the first label public key, the simple comparison value, and the inter-label key;

an intra-label key generating function which generates the intra-label key from the private key and the label; and an encrypting function which encrypts the intra-label comparison value by the intra-label key, and encrypts the column data by the private key at the same time.

(Supplementary Note 3)

The encrypted database system as depicted in Supplementary Note 1, wherein:

the intra-label projection request unit includes an intra-label key generating function which generates the intra-label key from the private key and the first label; and the inter-label projection request unit includes an inter-label projection key generating function which generates the inter-label key from the private key and the second label, a second label public key generating function which generates a second label public key from the group generator and the inter-label key, an interpolation value generating function which generates an interpolation value from the first and second labels as well as the private key, and a projection key generating function which generates an inter-label projection key from the second label public key and the interpolation value.

(Supplementary Note 4)

The encrypted database system as depicted in Supplementary Note 1, wherein:

the intra-label projection unit includes an intra-label comparison value generating function which generates a first and a second intra-label comparison values from the intra-label key and the encrypted column data of the encrypted first and second tables; and the inter-label projection unit includes an inter-label comparison value generating function which takes the inter-label projection key as well as the first and second intra-label comparison values as input of bilinear mapping, and outputs the output thereof as the first and second inter-label comparison values, respectively.

(Supplementary Note 5)

A client terminal which constitutes an encrypted database system by being mutually connected to an encrypted database server, and the client terminal includes:

a storage module which stores in advance an encrypting key as well as a first and a second group generators constituting a main part of the encrypting key;

a column encrypting unit which encrypts data of a column indicated by a first label of a first table inputted from outside with the encrypting key and the first group generator, also encrypts data of a column indicated by a second label of a second table inputted from outside with the encrypting key and the second group generator, and outputs the encrypted first and second tables to the outside;

an intra-label projection request unit which generates a first intra-label key from the encrypting key and the first label, generates a second intra-label key from the encrypting key and the second label, and outputs the first and second intra-label keys to the outside; and an inter-label projection request unit which generates a first inter-label projection key from the encrypting key, the first group generator, and the first and second intra-label keys, generates a second inter-label projection key from the encrypting key, the second group generator, and the first and second intra-label keys, and outputs the first and second inter-label projection keys to the outside.

(Supplementary Note 6)

An encrypted database server which constitutes an encrypted database system by being mutually connected to a client terminal, and the encrypted database server includes:

a data receiving unit which receives and stores a first table where a column indicated by a first label is encrypted and a second table where a column indicated by a second label is encrypted, which are transmitted from the client terminal, and receives a first and a second intra-label keys as well as a first and a second inter-label projection keys transmitted from the client terminal;

an intra-label projection unit which generates a first intra-label comparison value by having the first label and the first intra-label key worked on data of the column indicated by the first label of the encrypted first table, and generates a second intra-label comparison value by having the second label and the second intra-label key worked on data of the column indicated by the second label of the encrypted second table;

an inter-label projection unit which generates a first inter-label comparison value which generates a first inter-label comparison value by having the first inter-label projection key worked on the first intra-label comparison value, and generates a second inter-label comparison value which generates a second inter-label comparison value by having the second inter-label projection key worked on the second intra-label comparison value; and an encrypted table natural joining unit which executes natural joining on the encrypted first and second tables by utilizing the outputted first and second inter-label comparison values.

(Supplementary Note 7)

An encrypted table natural joining method used in an encrypted database system constituted with a client terminal and an encrypted database server mutually connected to each other, wherein:

a column encrypting unit of the client terminal encrypts data of a column indicated by a first label of a first table inputted from outside with an encrypting key and a first group generator that constitutes a main part of the encrypting key stored in advance, and outputs it to the outside;

the column encrypting unit of the client terminal encrypts data of a column indicated by a second label of a second table inputted from outside with the encrypting key and a second group generator that constitutes a main part of the encrypting key stored in advance, and outputs it to the outside;

an intra-label projection request unit of the client terminal generates a first intra-label key from the encrypting key and the first label, and outputs it to the outside;

the intra-label projection request unit of the client terminal generates a second intra-label key from the encrypting key and the second label, and outputs it to the outside;

an inter-label projection request unit of the client terminal generates a first inter-label projection key from the encrypting key, the first group generator, and the first and second intra-label keys, and outputs it to the outside;

the inter-label projection request unit of the client terminal generates a second inter-label projection key from the encrypting key, the second group generator, and the first and second intra-label keys, and outputs it to the outside;

a data receiving unit of the encrypted database server receives the encrypted first and second tables, and receives the first and second intra-label keys as well as the first and second inter-label projection keys;

an intra-label projection unit of the encrypted database server generates a first intra-label comparison value by having the first label and the first intra-label key worked on the data of the column indicated by the first label of the encrypted first table;

the intra-label projection unit of the encrypted database server generates a second intra-label comparison value by having the second label and the second intra-label key worked on the data of the column indicated by the second label of the encrypted second table;

an inter-label projection unit of the encrypted database server generates a first inter-label comparison value by having the first inter-label projection key worked on the first intra-label comparison value;

the inter-label projection unit of the encrypted database server generates a second inter-label comparison value by having the second inter-label projection key worked on the second intra-label comparison value; and an encrypted table natural joining unit of the encrypted database server executes natural joining on the encrypted first and second tables by utilizing the first and second inter-label comparison values.

(Supplementary Note 8)

An encrypted table natural joining program used in an encrypted database system constituted with a client terminal and an encrypted database server mutually connected to each other, and the program causes a computer provided to the client terminal to execute:

a procedure for encrypting data of a column indicated by a first label of a first table inputted from outside with an encrypting key and a first group generator that constitutes a main part of the encrypting key stored in advance, and outputting it to the outside;

a procedure for encrypting data of a column indicated by a second label of a second table inputted from outside with the encrypting key and a second group generator that constitutes a main part of the encrypting key stored in advance, and outputting it to the outside, a procedure for generating a first intra-label key from the encrypting key and the first label, and outputting it to the outside;

a procedure for generating a second intra-label key from the encrypting key and the second label, and outputting it to the outside;

a procedure for generating a first inter-label projection key from the encrypting key, the first group generator, and the first and second intra-label keys, and outputting it to the outside; and a procedure for generating a second inter-label projection key from the encrypting key, the second group generator, and the first and second intra-label keys, and outputting it to the outside.

(Supplementary Note 9)

An encrypted table natural joining program used in an encrypted database system constituted with a client terminal and an encrypted database server mutually connected to each other, and the program causes a computer provided to the encrypted database server to execute:

a procedure for receiving the encrypted first and second tables, the first and second intra-label keys as well as the first and second inter-label projection keys;

a procedure for generating a first intra-label comparison value by having the first label and the first intra-label key worked on data of a column indicated by the first label of the encrypted first table;

a procedure for generating a second intra-label comparison value by having the second label and the second intra-label key worked on data of a column indicated by the second label of the encrypted second table;

a procedure for generating a first inter-label comparison value by having the first inter-label projection key worked on the first intra-label comparison value;

a procedure for generating a second inter-label comparison value by having the second inter-label projection key worked on the second intra-label comparison value; and a procedure for executing natural joining on the encrypted first and second tables by utilizing the first and second inter-label comparison values.

This application claims the Priority right based on Japanese Patent Application No. 2010-277070 filed on Dec. 13, 2010 and the disclosure thereof is hereby incorporated by reference in its entirety.

INDUSTRIAL APPLICABILITY

The present invention can be generally applied to encrypted database systems. In particular, the present invention exhibits excellent effects for preventing confidential information from being leaked in the encrypted database system which is required to perform natural joining processing frequently.

REFERENCE NUMERALS

1 Encrypted database management system
10 Encrypted database client
11, 51 Central processing control module
12, 52 Storage module
13 Input module
14 Output module
15, 53 Communication module
21 Column encrypting unit
21*a* Intra-label key generating function
21*b* Inter-label key generating function
21*c* First label public key generating function
21*d* Comparison value generating function
21*e* Concealed comparison value generating function
21*f* Encrypting function
21*g* Random number generating function
22 Intra-label projection request unit
23 Inter-label projection request unit
23*a* Inter-label projection key generating function
23*b* Second label public key generating function
23*c* Interpolation value generating function
23*d* Projection key generating function
31 Private key
32*a*, 32*b* Group generator
33*a*, 33*b* Label
34*a*, 34*b* Column data
35 Table A
36 Table B
37 Encrypted table A
38 Encrypted table B
39*a*, 39*b* Encrypted column data
41*a* Inter-label key
41*b* First label public key
41*c* Simple comparison value
41*d* Intra-label comparison value
41*e* Intra-label key
41*f*, 43*a* Ciphertext
41*g* Random number
42*a* Second label public key
42*b* Interpolation value
42*c* Inter-label projection key
43 Intra-label comparison value
50 Encrypted database server
61 Intra-label projection unit
61*a* Intra-label comparison value generating function
62 Inter-label projection unit
62*a* Inter-label comparison value generating function
63 Encrypted table natural joining unit
64 Data receiving unit
81 Encrypted table A×B
100 Another client
121 Decrypting unit
131 Public key

The invention claimed is:

1. An encrypted database system constituted with a client terminal and an encrypted database server mutually connected to each other, wherein:

the client terminal comprises a storage module which stores in advance an encrypting key as well as a first and a second group generators constituting a main part of the encrypting key, a column encrypting unit which encrypts data of a column indicated by a first label of a first table inputted from outside with the encrypting key and the first group generator, encrypts data of a column indicated by a second label of a second table inputted from outside with the encrypting key and the second group generator, and transmits the encrypted first and second tables to the encrypted database server, an intra-label projection request unit which generates a first intra-label key from the encrypting key and the first label, generates a second intra-label key from the encrypting key and the second label, and transmits the first and second intra-label keys to the encrypted database server, and an inter-label projection request unit which generates a first inter-label projection key from the encrypting key, the first group generator, and the first and second intra-label keys, generates a second inter-label projection key from the encrypting key, the second group generator, and the first and second intra-label keys, and transmits the first and second inter-label projection keys to the encrypted database server; and the encrypted database server comprises a data receiving unit which receives and stores the encrypted first and second tables, and receives the first and second intra-label keys as well as the first and second inter-label projection keys, an intra-label projection unit which generates a first intra-label comparison value by having the first label and the first intra-label key worked on the data of the column indicated by the first label of the encrypted first table, and generates a second intra-label comparison value by having the second label and the second intra-label key worked on the data of the column indicated by the second label of the encrypted second table, an inter-label projection unit which generates a first inter-label comparison value which generates a first inter-label comparison value by having the first inter-label projection key worked on the first intra-label comparison value, and generates a second inter-label comparison value by having the second inter-label projection key worked on the second intra-label comparison value, and an encrypted table natural joining unit which executes natural joining on the encrypted first and second tables by utilizing the first and second inter-label comparison values.

2. The encrypted database system as claimed in claim 1, wherein the column encrypting unit comprises:

an inter-label key generating function which generates an inter-label key from a private key and each of the first and second labels;

a first label public key generating function which generates a first label public key from each of the first and second group generators and each of the first and second inter-label projection keys;

a comparison value generating function which generates a simple comparison value from the private key and the column data;

a concealed comparison value generating function which generates an intra-label comparison value from the first label public key, the simple comparison value, and the inter-label key;

an intra-label key generating function which generates the intra-label key from the private key and each of the first and second labels; and an encrypting function which encrypts the intra-label comparison value by the intra-label key, and encrypts the column data by the private key at the same time.

3. The encrypted database system as claimed in claim 1, wherein:

the intra-label projection request unit comprises an intra-label key generating function which generates the intra-label key from the private key and the first label; and the inter-label projection request unit comprises an inter-label projection key generating function which generates the inter-label key from the private key and the second label, a second label public key generating function which generates a second label public key from each of the first and second group generators and the inter-label key, an interpolation value generating function which generates an interpolation value from the first and second labels as well as the private key, and a projection key generating function which generates an inter-label projection key from the second label public key and the interpolation value.

4. The encrypted database system as claimed in claim 1, wherein:

the intra-label projection unit comprises an intra-label comparison value generating function which generates a first and a second intra-label comparison values from the intra-label key and the encrypted column data of the encrypted first and second tables; and the inter-label projection unit comprises an inter-label comparison value generating function which takes the first and second inter-label projection keys as well as the first and second intra-label comparison values as input of bilinear mapping, and outputs the output thereof as the first and second inter-label comparison values, respectively.

5. A client terminal which constitutes an encrypted database system by being mutually connected to an encrypted database server, the client terminal comprising:

a storage module which stores in advance an encrypting key as well as a first and a second group generators constituting a main part of the encrypting key;

a column encrypting unit which encrypts data of a column indicated by a first label of a first table inputted from outside with the encrypting key and the first group generator, also encrypts data of a column indicated by a second label of a second table inputted from outside with the encrypting key and the second group generator, and transmits the encrypted first and second tables to the encrypted database server;

an intra-label projection request unit which generates a first intra-label key from the encrypting key and the first label, generates a second intra-label key from the encrypting key and the second label, and transmits the first and second intra-label keys to the encrypted database server; and an inter-label projection request unit which generates a first inter-label projection key from the encrypting key, the first group generator, and the first and second intra-label keys, generates a second inter-label projection key from the encrypting key, the second group generator, and the first and second intra-label keys, and transmits the first and second inter-label projection keys to the encrypted database server.

6. An encrypted database server which constitutes an encrypted database system by being mutually connected to a client terminal, the encrypted database server comprising:

a data receiving unit which receives and stores a first table where a column indicated by a first label is encrypted and a second table where a column indicated by a second label is encrypted, which are transmitted from the client terminal, and receives a first and a second intra-label keys as well as a first and a second inter-label projection keys transmitted from the client terminal;

an intra-label projection unit which generates a first intra-label comparison value by having the first label and the first intra-label key worked on data of the column indicated by the first label of the encrypted first table, and generates a second intra-label comparison value by having the second label and the second intra-label key worked on data of the column indicated by the second label of the encrypted second table;

an inter-label projection unit which generates a first inter-label comparison value by having the first inter-label projection key worked on the first intra-label comparison value, and generates a second inter-label comparison value by having the second inter-label projection key worked on the second intra-label comparison value; and an encrypted table natural joining unit which executes natural joining on the encrypted first and second tables by utilizing the first and second inter-label comparison values.

7. An encrypted table natural joining method used in an encrypted database system constituted with a client terminal and an encrypted database server mutually connected to each other, wherein:

a column encrypting unit of the client terminal encrypts data of a column indicated by a first label of a first table inputted from outside with an encrypting key and a first group generator that constitutes a main part of the encrypting key stored in advance, and transmits it to the encrypted database server;

the column encrypting unit of the client terminal encrypts data of a column indicated by a second label of a second table inputted from outside with the encrypting key and a second group generator that constitutes a main part of the encrypting key stored in advance, and transmits it to the encrypted database server;

an intra-label projection request unit of the client terminal generates a first intra-label key from the encrypting key and the first label, and transmits it to the encrypted database server;

the intra-label projection request unit of the client terminal generates a second intra-label key from the encrypting key and the second label, and transmits it to the encrypted database server;

an inter-label projection request unit of the client terminal generates a first inter-label projection key from the encrypting key, the first group generator, and the first and second intra-label keys, and transmits it to the encrypted database server;

the inter-label projection request unit of the client terminal generates a second inter-label projection key from the encrypting key, the second group generator, and the first and second intra-label keys, and transmits it to the encrypted database server;

a data receiving unit of the encrypted database server receives the encrypted first and second tables, and receives the first and second intra-label keys as well as the first and second inter-label projection keys;

an intra-label projection unit of the encrypted database server generates a first intra-label comparison value by having the first label and the first intra-label key worked on the data of the column indicated by the first label of the encrypted first table;

the intra-label projection unit of the encrypted database server generates a second intra-label comparison value by having the second label and the second intra-label key worked on the data of the column indicated by the second label of the encrypted second table;

an inter-label projection unit of the encrypted database server generates a first inter-label comparison value by having the first inter-label projection key worked on the first intra-label comparison value;

the inter-label projection unit of the encrypted database server generates a second inter-label comparison value by having the second inter-label projection key worked on the second intra-label comparison value; and an encrypted table natural joining unit of the encrypted database server executes natural joining on the encrypted first and second tables by utilizing the first and second inter-label comparison values.

8. A non-transitory computer readable recording medium storing an encrypted table natural joining program used in an encrypted database system constituted with a client terminal and an encrypted database server mutually connected to each other, the program causing a computer provided to the client terminal to execute:

a procedure for encrypting data of a column indicated by a first label of a first table inputted from outside with an encrypting key and a first group generator that constitutes a main part of the encrypting key stored in advance, and transmitting it to the encrypted database server;

a procedure for encrypting data of a column indicated by a second label of a second table inputted from outside with the encrypting key and a second group generator that constitutes a main part of the encrypting key stored in advance, and transmitting it to the encrypted database server, a procedure for generating a first intra-label key from the encrypting key and the first label, and transmitting it to the encrypted database server;

a procedure for generating a second intra-label key from the encrypting key and the second label, and transmitting it to the encrypted database server;

a procedure for generating a first inter-label projection key from the encrypting key, the first group generator, and the first and second intra-label keys, and transmitting it to the encrypted database server; and a procedure for generating a second inter-label projection key from the encrypting key, the second group generator, and the first and second intra-label keys, and transmitting it to the encrypted database server.

9. A non-transitory computer readable recording medium storing an encrypted table natural joining program used in an encrypted database system constituted with a client terminal and an encrypted database server mutually connected to each other, the program causing a computer provided to the encrypted database server to execute:

a procedure for receiving the encrypted first and second tables, the first and second intra-label keys as well as the first and second inter-label projection keys;

a procedure for generating a first intra-label comparison value by having the first label and the first intra-label key worked on data of a column indicated by the first label of the encrypted first table;

a procedure for generating a second intra-label comparison value by having the second label and the second intra-label key worked on data of a column indicated by the second label of the encrypted second table;

a procedure for generating a first inter-label comparison value by having the first inter-label projection key worked on the first intra-label comparison value;

a procedure for generating a second inter-label comparison value by having the second inter-label projection key worked on the second intra-label comparison value; and a procedure for executing natural joining on the encrypted first and second tables by utilizing the first and second inter-label comparison values.

10. An encrypted database system constituted with a client terminal and an encrypted database server mutually connected to each other, wherein:

the client terminal comprises storage means for storing in advance an encrypting key as well as a first and a second group generators constituting a main part of the encrypting key, column encrypting means for encrypting data of a column indicated by a first label of a first table inputted from outside with the encrypting key and the first group generator, encrypting data of a column indicated by a second label of a second table inputted from outside with the encrypting key and the second group generator, and transmitting the encrypted first and second tables to the encrypted database server, intra-label projection request means for generating a first intra-label key from the encrypting key and the first label, generating a second intra-label key from the encrypting key and the second label, and transmitting the first and second intra-label keys to the encrypted database server, and inter-label projection request means for generating a first inter-label projection key from the encrypting key, the first group generator, and the first and second intra-label keys, generating a second inter-label projection key from the encrypting key, the second group generator, and the first and second intra-label keys, and transmitting the first and second inter-label projection keys to the encrypted database server; and the encrypted database server comprises data receiving means for receiving and storing the encrypted first and second tables, and receiving the first and second intra-label keys as well as the first and second inter-label projection keys, intra-label projection means for generating a first intra-label comparison value by having the first label and the first intra-label key worked on the data of the column indicated by the first label of the encrypted first table, and generating a second intra-label comparison value by having the second label and the second intra-label key worked on the data of the column indicated by the second label of the encrypted second table, inter-label projection means for generating a first inter-label comparison value which generates a first inter-label comparison value by having the first inter-label projection key worked on the first intra-label comparison value, and generating a second inter-label comparison value by having the second inter-label projection key worked on the second intra-label comparison value, and encrypted table natural joining means for executing natural joining on the encrypted first and second tables by utilizing the transmitted first and second inter-label comparison values.

11. A client terminal which constitutes an encrypted database system by being mutually connected to an encrypted database server, the client terminal comprising:

storage means for storing in advance an encrypting key as well as a first and a second group generators constituting a main part of the encrypting key;

column encrypting means for encrypting data of a column indicated by a first label of a first table inputted from outside with the encrypting key and the first group generator, also encrypting data of a column indicated by a second label of a second table inputted from outside with the encrypting key and the second group generator, and transmitting the encrypted first and second tables to the encrypted database server;

intra-label projection request means for generating a first intra-label key from the encrypting key and the first label, generating a second intra-label key from the encrypting key and the second label, and transmitting the first and second intra-label keys to the encrypted database server; and inter-label projection request means for generating a first inter-label projection key from the encrypting key, the first group generator, and the first and second intra-label keys, generating a second inter-label projection key from the encrypting key, the second group generator, and the first and second intra-label keys, and transmitting the first and second inter-label projection keys to the encrypted database server.

12. An encrypted database server which constitutes an encrypted database system by being mutually connected to a client terminal, the encrypted database server comprising:

data receiving means for receiving and storing a first table where a column indicated by a first label is encrypted and a second table where a column indicated by a second label is encrypted, which are transmitted from the client terminal, and receiving a first and a second intra-label keys as well as a first and a second inter-label projection keys transmitted from the client terminal;

intra-label projection means for generating a first intra-label comparison value by having the first label and the first intra-label key worked on data of the column indicated by the first label of the encrypted first table, and generating a second intra-label comparison value by having the second label and the second intra-label key worked on data of the column indicated by the second label of the encrypted second table;

inter-label projection means for generating a first inter-label comparison value by having the first inter-label projection key worked on the first intra-label comparison value, and generating a second inter-label comparison value by having the second inter-label projection key worked on the second intra-label comparison value; and encrypted table natural joining means for executing natural joining on the encrypted first and second tables by utilizing the first and second inter-label comparison values.

* * * * *

UNITED STATES PATENT AND TRADEMARK OFFICE

CERTIFICATE OF CORRECTION

PATENT NO. : 9,037,846 B2
APPLICATION NO. : 13/993520
DATED : May 19, 2015
INVENTOR(S) : Jun Furukawa It is certified that error appears in the above-identified patent and that said Letters Patent is hereby corrected as shown below:

IN THE SPECIFICATION

Column 5, Line 14: Delete “pkey'972a” and insert -- pkey972a --
Column 12, Line 26: Delete ““KB”,” and insert -- “A^B”, --
Column 17, Line 63: Delete “Intra” and insert -- Inter --
Column 20, Line 37: Delete “
$$\mathrm{pair}(d[1], P[1]) = \mathrm{pair}\left( g_1^{\times[L[1]]HashZ(\text{"}value\text{"},key,m[1]}, q[L[1]]^{p[L[1],L[2]]} \right) = \mathrm{pair}(g_1, g_2)^{HashZ(\text{"}value\text{"},key,m[1])\times[L[1]]\times[L[2]]p[L[1],L[2]]}$$
” and insert --
$$pair(d[1],P[1]) = pair\left(g_1^{x[L[1]]HashZ(\text{"}value\text{"},key,m[1]}, q[L[1]]^{p[L[1],L[2]]}\right) = pair(g_1, g_2)^{HashZ(\text{"}value\text{"},key,m[1])x[L[1]]x[L[2]]p[L[1],L[2]]}$$
--

Column 20, Line 42: Delete

“
$$\mathrm{pair}(d[2], P[2]) = \mathrm{pair}\left( g_1^{\times[L[2]]HashZ(\text{"}value\text{"},key,m[2]}, q[L[2]]^{p[L[2],L[1]]} \right) = \mathrm{pair}(g_1, g_2)^{HashZ(\text{"}value\text{"},key,m[2])\times[L[2]]\times[L[1]]p[L[2],L[1]]}$$
” and Signed and Sealed this
First Day of March, 2016

Michelle K. Lee
*Director of the United States Patent and Trademark Office* insert $$pair(d[2], P[2]) = pair\left(g_1^{x[L[2]]HashZ(\text{"value"}; key, m[2])}, q[L[2]]^{p[L[2], L[1]]}\right)$$

-- $$= pair(g_1, g_2)^{HashZ(\text{"value"}; key, m[2])x[L[2]]x[L[1]]p[L[2], L[1]]}$$ --